United States Patent
Eura et al.

(10) Patent No.: US 8,194,934 B2
(45) Date of Patent: Jun. 5, 2012

(54) APPARATUS FOR AND METHOD OF USING RELIABILITY INFORMATION TO PRODUCE AND UPDATE IMAGE RECOGNITION DATA

(75) Inventors: Yuka Eura, Tokyo (JP); Tamaki Kojima, Kanagawa (JP); YuHang Shen, Tokyo (JP)

(73) Assignee: Sony Corporation (JP)

( * ) Notice: Subject to any disclaimer, the term of this patent is extended or adjusted under 35 U.S.C. 154(b) by 1253 days.

(21) Appl. No.: 11/978,499

(22) Filed: Oct. 29, 2007

(65) Prior Publication Data

US 2008/0137918 A1 Jun. 12, 2008

(30) Foreign Application Priority Data

Nov. 8, 2006 (JP) ................ P2006-302305

(51) Int. Cl.
*G06K 9/00* (2006.01)
(52) U.S. Cl. ....... 382/115; 382/118; 340/5.53; 340/5.83
(58) Field of Classification Search .......... None
See application file for complete search history.

(56) References Cited

U.S. PATENT DOCUMENTS

| | | | | |
|---|---|---|---|---|
| 5,127,055 A | * | 6/1992 | Larkey | 704/244 |
| 6,819,783 B2 | * | 11/2004 | Goldberg et al. | 382/115 |
| 7,379,568 B2 | * | 5/2008 | Movellan et al. | 382/118 |
| 7,398,549 B2 | * | 7/2008 | Ting | 726/5 |
| 7,760,917 B2 | * | 7/2010 | Vanhoucke et al. | 382/115 |
| 7,885,531 B2 | * | 2/2011 | Kim et al. | 396/153 |
| 2006/0115129 A1 | * | 6/2006 | Abe | 382/115 |
| 2007/0098231 A1 | * | 5/2007 | Minato | 382/118 |
| 2010/0060417 A1 | * | 3/2010 | Niinuma | 340/5.82 |

FOREIGN PATENT DOCUMENTS

| | | |
|---|---|---|
| JP | 9-035068 A | 2/1997 |
| JP | 11-154230 A | 6/1999 |
| JP | 2000-099720 A | 4/2000 |
| JP | 2002-334334 A | 11/2002 |
| JP | 2003-141541 A | 5/2003 |
| JP | 2003-271958 A | 9/2003 |
| JP | 2005-122395 A | 5/2005 |

* cited by examiner

*Primary Examiner* — Stephen R Koziol
*Assistant Examiner* — Barry Drennan
(74) *Attorney, Agent, or Firm* — Lerner, David, Littenberg, Krumholz & Mentlik, LLP

(57) ABSTRACT

In an information processing apparatus, an acquisition unit acquires information of a predetermined type, and a reliability information producing unit produces reliability information indicating reliability of the information of the predetermined type on the basis of a deviation from a predetermined standard condition. A storage unit stores the reliability information indicating the reliability of the information of the predetermined type produced by the reliability information producing unit, in association with the information of the predetermined type.

11 Claims, 15 Drawing Sheets

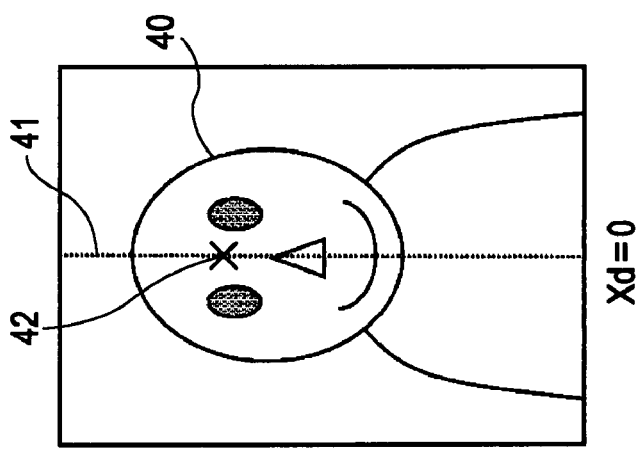
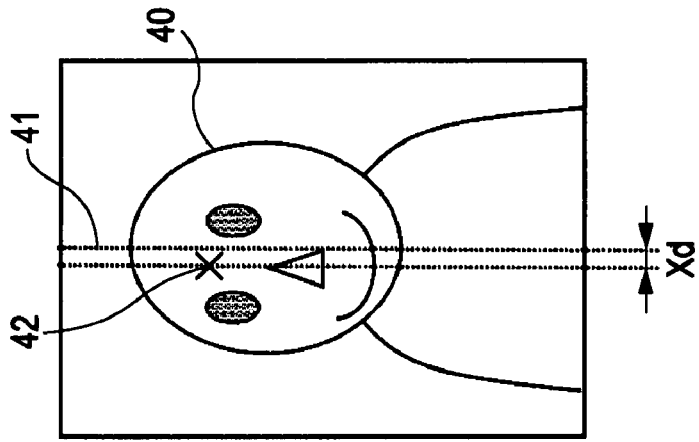
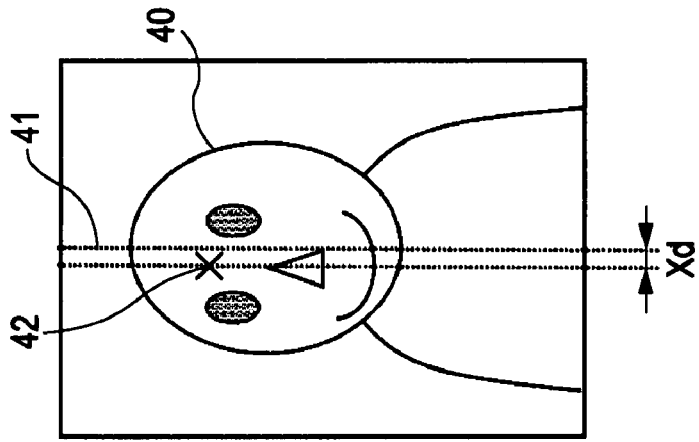

APPARATUS FOR AND METHOD OF USING RELIABILITY INFORMATION TO PRODUCE AND UPDATE IMAGE RECOGNITION DATA

CROSS REFERENCES TO RELATED APPLICATIONS

The present application claims priority from Japanese Patent Application No. JP 2006-302305 filed in the Japanese Patent Office on Nov. 8, 2006, the entire content of which is incorporated herein by reference.

BACKGROUND OF THE INVENTION

1. Field of the Invention

The present invention relates to an information processing apparatus and an information processing method capable of evaluating reliability of acquired information and processing information in accordance with the reliability. The present invention also relates to a person identification apparatus adapted to identify a person using, for example, a face image, and to a method of producing/updating dictionary data in a person identification apparatus.

2. Description of the Related Art

In a person identification method according to a related art, feature data of an identification element such as a human face, a voice, a fingerprint, etc. is stored in advance for a plurality of persons to be identified. When feature data of an identification element of a person to be identified is given, the given feature data is compared with the feature data of the identification element stored as the dictionary data of each person thereby identifying whose identification element the given identification element is.

In this person identification method, in a case where a face image is used as the identification element, a feature image of each person to be identifies is acquired, and dictionary data is produced using featured data extracted from the face image. In the production of dictionary data, in general, in order to minimize an effect of a variation of a condition under which the face image used as the identification element is taken or a variation of the orientation of a face, a plurality of face images of each person are acquired and the average feature data of the face images is stored as the dictionary data of each person (see, for example, Japanese Unexamined Patent Application Publication No. 2003-271958).

In general, each time a face image of a person is identified, the dictionary data of the face image of the person is updated using feature data of the identified face image of the person.

In general, in the production/update of the dictionary data, a plurality of face images are treated equally without being weighted.

SUMMARY OF THE INVENTION

To correctly identify a face image, it is desirable that the face image satisfy basic requirements such as a requirement of having an image size greater than, for example, 64×64 pixels, a requirement that orientation of the face image should be in an exact front direction, a requirement that two eyes should lie on a horizontal line, etc.

However, in practice, the acquired face image does not necessarily always satisfy the basic requirements.

In the process of identifying a face image, if the basic requirements are not satisfied, a correction is made by performing interpolation, rotation, and/or the like on the face image data so that the basic requirements are satisfied as to great a degree as possible, thereby making it possible to identify the face image.

If the given face image is successfully identified, the dictionary data is produced or updated using feature data of this face image without weighting the face image. In other words, the dictionary data is produced or updated using feature data of face images equally weighted regardless of whether the face image satisfy the basic requirement or not.

However, equal weighting for all feature data of face images can cause a reduction in accuracy or reliability of the produced/updated dictionary data.

The above problem can occur not only in the production/update of the dictionary data of face images but in many processes in which all given images are equally weighted although the given images can vary in degree of satisfaction of basic requirements.

The above problem can occur not only for the case where the identification element of persons is a face image but also can occur for other identification elements such as a fingerprint, an iris pattern, etc. Furthermore, the above problem can occur not only for image information such as face image information or fingerprint image information, but also can occur for audio information such as a voice print used as the identification element.

In view of the above, it is desirable to provide a technique to process given information taking into account a deviation from a predetermined basis requirement (requirements).

More specifically, it is desirable to provide a technique to produce/update dictionary data used in person identification based on an identification element such as a face image, taking into account the degree to which given information satisfies basic requirements, thereby achieving high accuracy and high reliability in the producing/updating of dictionary data.

According to an embodiment of the present invention, there is provided an information processing apparatus including acquisition means for acquiring information of a predetermined type, reliability information producing means for producing reliability information indicating reliability of the information of the predetermined type, on the basis of a deviation from a predetermined standard condition, and storage means for storing the reliability information indicating the reliability of the information of the predetermined type produced by the reliability information producing means, in association with the information of the predetermined type.

In this information processing apparatus, the reliability of the acquired information of the predetermined type is determined according to a deviation from the predetermined standard condition, and reliability information indicating the determined reliability is stored. Thus, information with high reliability can be selected on the basis of the reliability information and the selected information with high reliability can be used in processing.

According to an embodiment of the present invention there is provided a person identification apparatus including a dictionary data storage unit adapted to store person identification dictionary data associated with a person produced from a feature vector extracted from an identification elements of the person, in such a manner that the person identification dictionary data is stored in association with person identification information identifying the person, identification means for identifying a person having an identification element identical to an acquired identification element of a person by comparing feature data extracted from the acquired identification element of the person with the identification dictionary data stored in the dictionary data storage unit, reliability information producing means for producing reliability information indicating reliability of the acquired identification element on the basis of a deviation from a predetermined standard condition in terms of the identification element, a dictionary data production information storage unit adapted to store a plurality of sets of the reliability information indicating the reliability of the acquired identification element produced by the reliability information producing means and data of the acquired identification element or the feature data extracted from the identification element, for each person to be identified, in association with the person identification information, and dictionary data producing/updating means for producing or updating the identification dictionary data associated with each person to be identified using a plurality of identification element data or feature data extracted from the identification elements and reliability information thereof associated with each person corresponding to the person identification information stored in the dictionary data production information storage unit, wherein the feature data are weighted by weighting factors determined according to the reliability information.

In this person identification apparatus, the dictionary data is produced/updated using feature data of the identification element weighted by weighting factors determined according to deviations from the standard condition predetermined in terms of the identification element of persons, and thus it is possible to achieve high accuracy of dictionary data and high identification accuracy.

In the information processing apparatus described above, the reliability of the acquired information of the predetermined type is determined according to a deviation from the predetermined standard condition, and reliability information indicating the determined reliability is stored. Thus, information with high reliability can be selected on the basis of the reliability information and the selected information with high reliability can be used in processing.

In the person identification apparatus described above, high accuracy of dictionary data and high identification accuracy are achieved.

BRIEF DESCRIPTION OF THE DRAWINGS

FIGS. 12A to 12C are diagrams for explaining a process of calculating a score for a face image in a person identification apparatus according to an embodiment of the present invention;

DESCRIPTION OF THE PREFERRED EMBODIMENTS

The present invention is described in further detail below with reference to specific embodiments in conjunction with the accompanying drawings. In the embodiments described below, by way of example, the invention is applied to an identification apparatus adapted to identify a person using a face image as an identification element.

Figure 1:
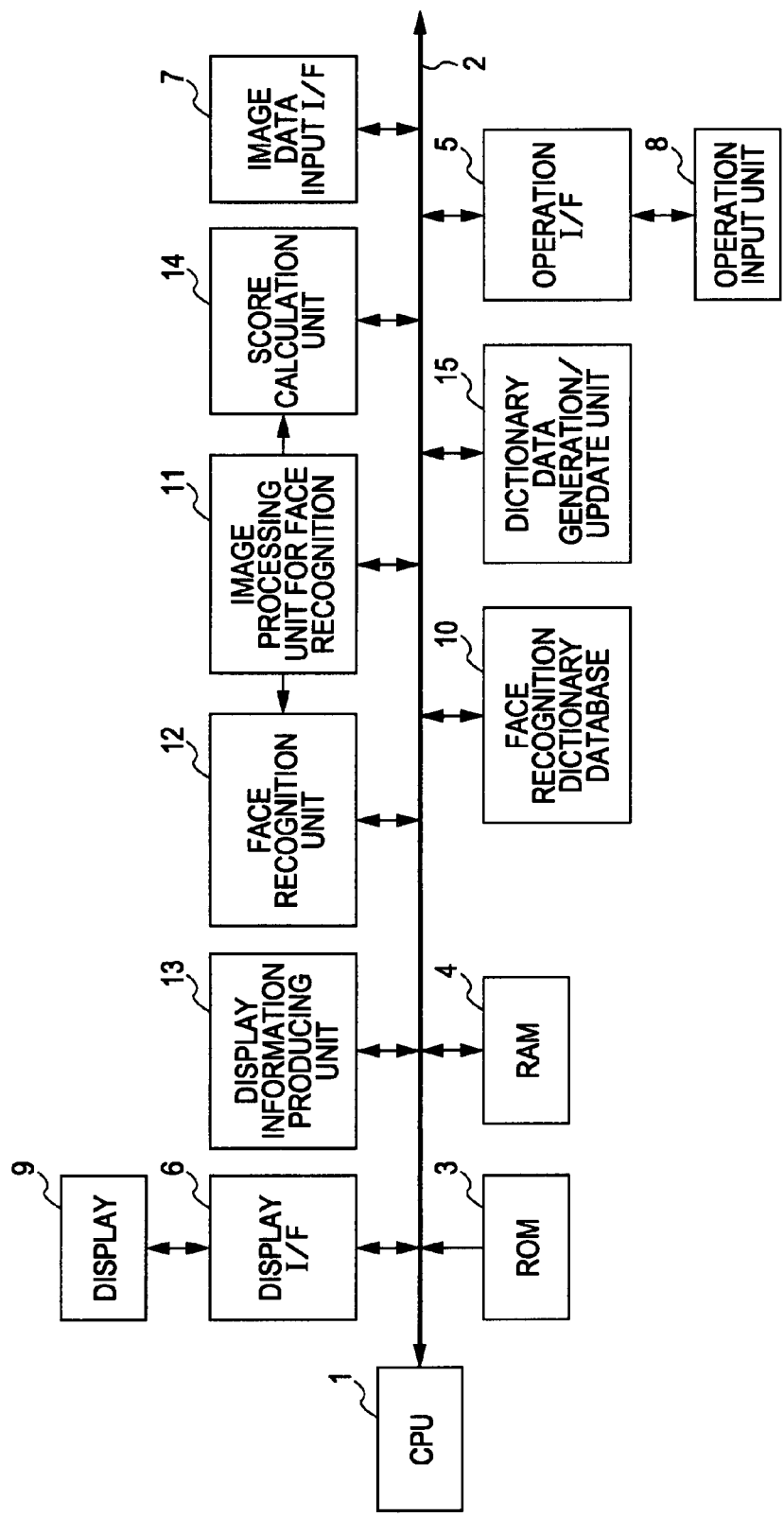
FIG. 1 is a block diagram illustrating an example of a hardware configuration of a person identification apparatus according to an embodiment of the present invention.

FIG. 1 is a block diagram illustrating an example of a configuration of a person identification apparatus adapted to identify a person using a face image according to an embodiment of the present invention. In the example shown in FIG. 1, the person identification apparatus adapted to identify a person using a face image is implemented on a personal computer or the like. In the configuration shown in FIG. 1, some blocks may be implemented in the form of software functional blocks.

In the person identification apparatus according to the present embodiment, as shown in FIG. 1, a CPU (Central Processing Unit) is connected, via a system bus 2, to a ROM (Read Only Memory) 3 in which a program and associated data are stored, a RAM (Random Access Memory) 4 for use as a work area, an operation unit interface 5, a display interface 76, and an image data input interface 7.

An operation input unit 8 including a keyboard, a mouse, and/or the like is connected to the operation unit interface 5.

A display 9 such as a LCD (liquid crystal display) is connected to the display interface 6.

In a case where image data from an image output apparatus such as a camera with a USB (Universal Serial Bus) interface is input via the image data input interface 7, the image data input interface 7 is configured to include a USB terminal and a USB interface.

In a case where image data output from a card-type memory is input via the image data input interface 7, the image data input interface 7 is configured in the form of a memory reader capable of reading image data from the card-type memory mounted thereon.

On the other hand, to receive image data from an optical disk, the image data input interface 7 is configured to include an optical disk drive capable of reading image data from the optical disk.

The image data input interface 7 reads not only image data but may also read data associated with the image data, such as Exif (Exchange image file format) data indicating a time at which an image was taken, conditions under which the image was taken, etc.

In the present embodiment, the system bus 2 is also connected to a face recognition dictionary database 10, a face recognition image processing unit 11, a face recognition unit 12, a display information generator 13, a score calculation unit 14, and a dictionary data producing/updating unit 15.

The face recognition dictionary database 10 is configured using part or all of a storage area of a storage device such as a hard disk drive. In the present embodiment, in the face recognition dictionary database 10, person dictionary data $D_i$ (i=1, 2, ..., where i denotes a person number) of each of a plurality of registered persons $P_i$ (i=1, 2, ...) to be identified by their face image is stored in association with person identification information (for example, a person identification ID) identifying each person. In the following description, "identification of a person using a face image" will also be expressed simply as "face recognition" or "face identification".

Figure 2:
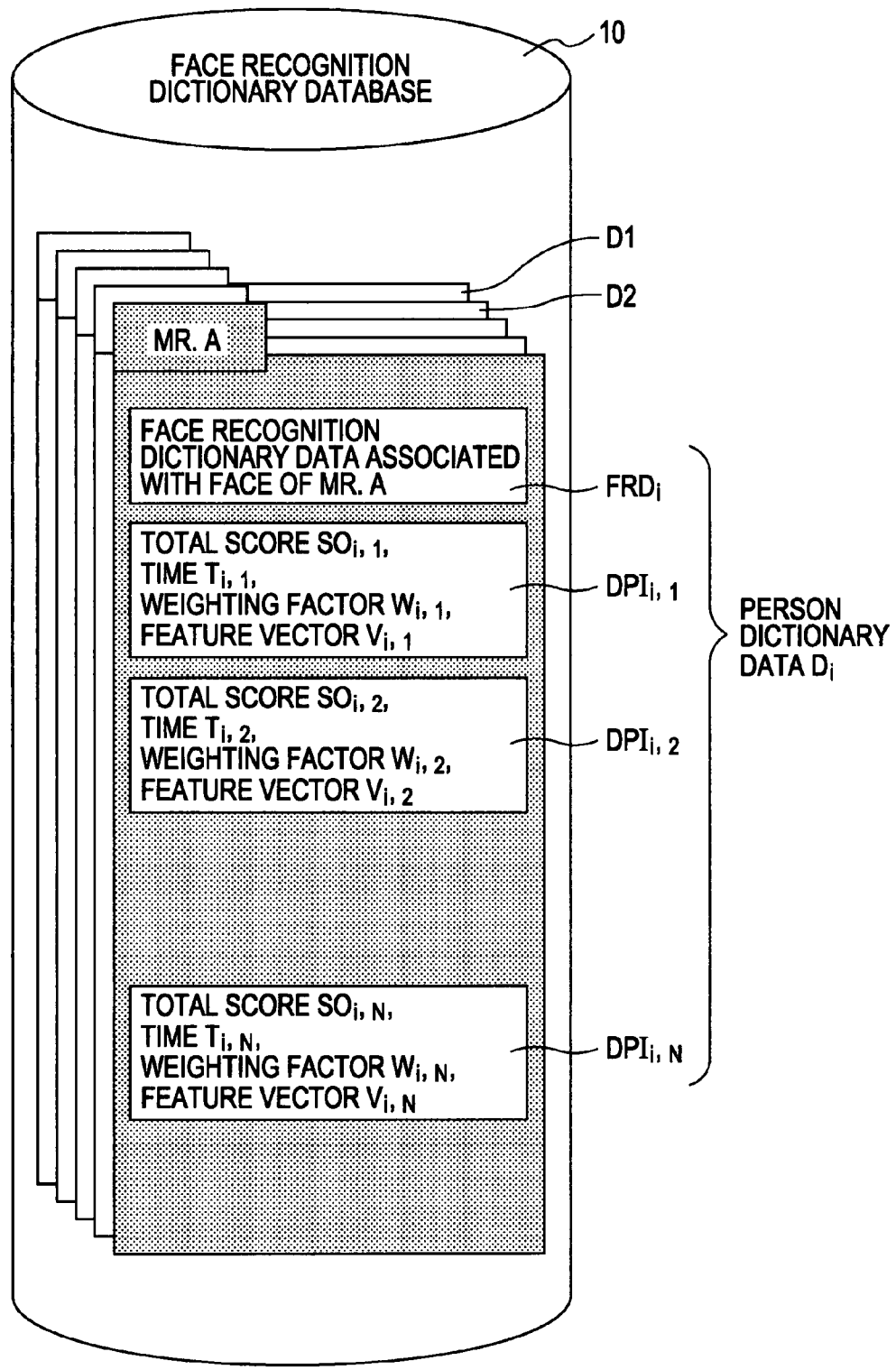
FIG. 2 is a diagram illustrating an example of content of a face recognition dictionary database according to an embodiment of the present invention.

In the present embodiment, as shown in FIG. 2, person dictionary data $D_i$ of each person includes face recognition dictionary data $FRD_i$ and one or n (n=1, 2, ..., N) pieces of dictionary data production information $DPI_{i,n}$, and is stored in association with person identification information. In the present embodiment, a person name is used as person identification information. Note that the person identification information is not limited to person names, but other information such as a person identification number, a person identification code, etc. or a combination of such information may be used as the person identification information.

In the present embodiment, the person dictionary data $D_i$ can store up to N (for example 40) pieces of dictionary data production information for each person. The upper limit on the number of pieces of dictionary data production information for each person is determined depending on the storage capacity of a storage in which the dictionary database is stored. Thus, in the present embodiment, the total score is calculated for each person dictionary data Di, and only person dictionary data with high total scores are retained if all person dictionary data cannot be stored because of the limit on the storage capacity.

The dictionary data production information $DPI_{i,n}$ includes n (up to N) pieces of face image information captured at different times for each person $P_i$ to be identified by the face image. In the present embodiment, as shown in FIG. 2, the dictionary data production information $DPI_{i,n}$ includes time information $T_{i,n}$, feature data $V_{i,n}$ of the captured face image, a total score $SO_{i,n}$ indicating the reliability of the captured face image (the calculation method thereof will be described in detail later), and a weighting factor $W_{i,n}$ determined based on the score $SO_{i,n}$.

In a case where the Exif information associated with the image data includes data indicating the time at which the image was taken, the time information included in the Exif information is directly used as the time information $T_{i,n}$. If the Exif information does not include data indicating the time at which the image was taken, the CPU 1 displays a message on the display 9 to prompt a user to input the time at which the image was taken, and employs, as the time information $T_{i,n}$, the time input by the user in response to the message. Alternatively, the time at which the image data was captured may be used as the time information $T_{i,n}$.

The face recognition dictionary data $FRD_i$ is feature data (feature vector) produced/updated using feature data (feature vector) of a face image stored as a part of the dictionary data production information $DPI_{i,n}$ of the i-th person $P_i$, and is dictionary data associated with the person $P_i$ on the basis of which the captured face image is recognized.

In the present embodiment, the face recognition dictionary data $FRD_i$ associated with each person $P_i$ is produced by performing a calculation using weighted feature data (feature vector) of the dictionary data production information $DPI_{i,n}$ associated with each person $P_i$ from the face recognition dictionary database 10. The details of the calculation including determination of the weighting factor for the feature data will be described later.

Figure 3:
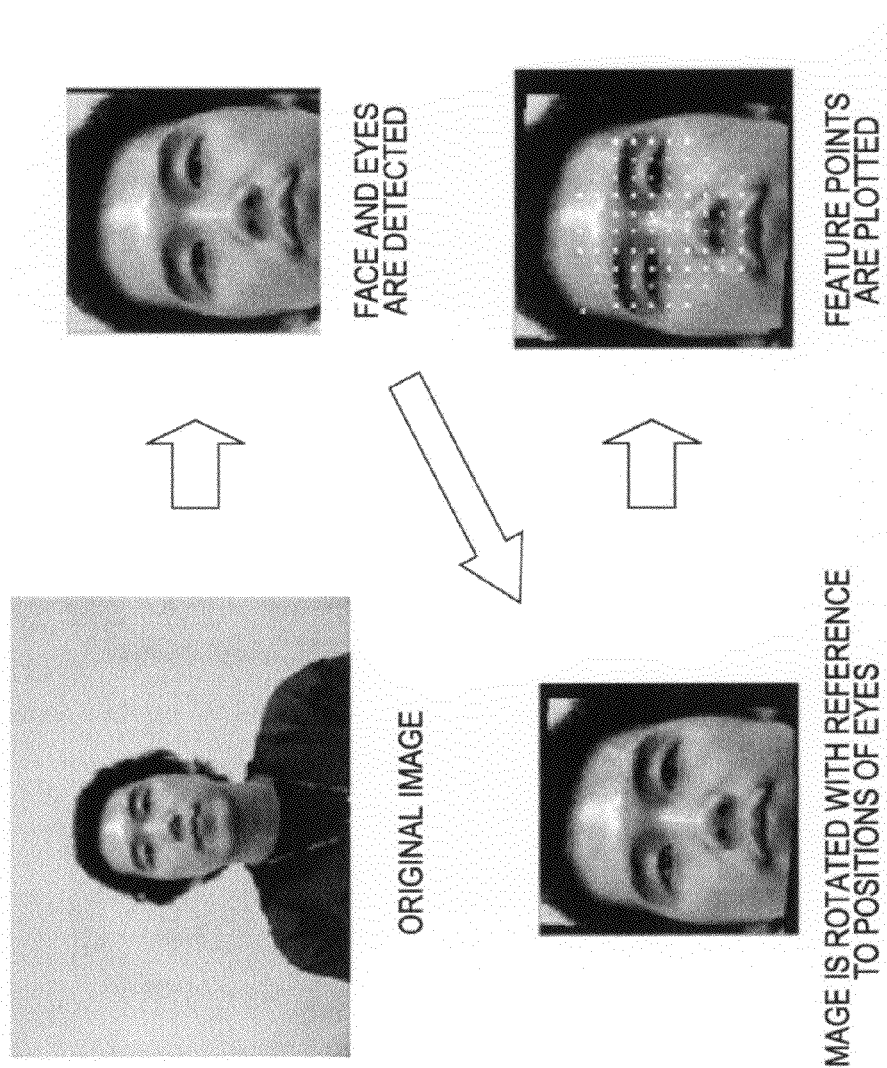
FIG. 3 illustrates an example of a face recognition process performed by a person identification apparatus according to an embodiment of the present invention.

As shown in FIG. 3, the face recognition image processing unit 11 detects a face and further eyes thereof from the original image data captured via the image data input interface 7, and rotates the face image such that detected two eyes lie on a horizontal line. This rotation is performed to convert the given face image into a state close to the reference face image taken exactly from front and with two eyes lying on a horizontal line used in the face recognition.

Furthermore, the face recognition image processing unit 11 plots feature points (performs sampling of feature points) for use in extraction of feature data of characteristic parts (such as eyebrows, eyes, a nose, a mouth, etc.) of a face image, and detects a feature vector Vin as feature data of the captured face image Fin. The feature vector Vin is given in the form of a function of a plurality of feature values.

The process of detecting a face and eyes thereof and the process of calculating the feature vector Vin performed by face recognition image processing unit 11 may be according to, for example, a technique disclosed in Japanese Unexamined Patent Application Publication No. 2006-72770, a technique disclosed in Japanese Unexamined Patent Application Publication No. 2005-44330, a technique disclosed in a paper titled "Learning of real-time arbitrary-position face detector based on pixel difference features" (Proceedings of the Symposium on Sensing via Image Information, June 2004, pp. 547-552), although details of techniques are not described herein.

The face recognition image processing unit 11 supplies the feature vector Vin acquired as the feature data of the captured face image Fin to the face recognition unit 12. Furthermore, the face recognition image processing unit 11 supplies face image data obtained as a result of the process of detecting the face and data indicating the eye detection result to the score calculation unit 15. In the present example, data indicating the image data size of the detected face image is attached to the face image data indicating the detected face supplied to the score calculation unit 15. The image data size of the face image is expressed by the number of pixels in a vertical direction and the number of pixels in a horizontal direction of the detected face image.

If the face recognition image processing unit 11 fails to detect a face or eyes, or if the face recognition image processing unit 11 fails to calculate the feature vector after a face and eyes are detected, the face recognition image processing unit 11 sends a message indicating the above fact to the face recognition unit 12 and the display information generator 13.

If the face recognition unit 12 receives the feature vector Vin as the feature data of the face image Fin acquired from the captured image from the face recognition image processing unit 11, the face recognition unit 12 compares the received feature vector Vin with the face recognition dictionary data (feature vector) $FRD_i$ of the plurality of persons stored in the face recognition dictionary database 10 to detect face recognition dictionary data $FRD_i$ identical to the feature vector Vin.

If face recognition dictionary data $FRD_i$ identical to the feature vector vin is detected, then the face recognition unit 12 sends, to the display information generator 13, a message indicating that face recognition dictionary data $FRD_i$ identical to the feature vector Vin has been detected, and person identification information (a name of a person in this specific example) corresponding to the detected face recognition dictionary data $FRD_i$.

On the other hand, if face recognition dictionary data $FRD_i$ identical to the feature vector Vin is not detected, then the face recognition unit 12 sends a message indicating this fact to the display information generator 13.

In the case where the face recognition unit 12 receives, from the face recognition image processing unit 11, the message indicating that the face recognition image processing unit 11 has failed to detect a face or eyes or if the face recognition image processing unit 11 has failed to calculate the feature vector although a face and eyes have been detected, the face recognition unit 12 does not perform the face recognition process described above.

Figure 4:
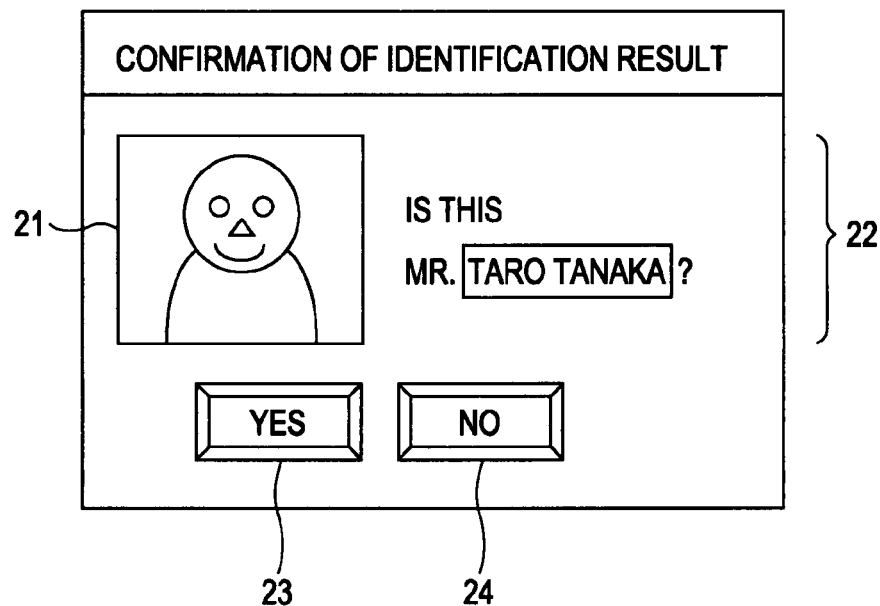
FIG. 4 is a diagram for explaining an example of a face recognition process performed by a person identification apparatus according to an embodiment of the present invention.

In the case where the display information generator 13 receives, from the face recognition unit 12, the message indicating that the face has been identified and the name of the person as the person identification information obtained as the result of the face recognition, the display information generator 13 produces display information of a face recognition result confirmation screen, such as that shown in FIG. 4, which makes it possible for a user to confirm the face recognition result, and display information generator 13 supplies the produced display information to the display 9 via the display interface 6. The display 9 displays the face recognition result confirmation screen on a display screen in accordance with the received display information.

On the face recognition result confirmation screen, as shown in FIG. 4, an image 21 of the captured face image Fin and a message 22 asking the user whether the face recognition result is correct are displayed. An example of the message is "Is this Mr. xxxxx?" where "xxxxx" is the name obtained as the result of the face recognition. In addition, button icons 23 and 24 for use to respond to the inquiry message 22 are also displayed.

In the present example, the face recognition unit 12 has determined that the feature data of the captured face image is identical to the feature data (face recognition dictionary data $FRD_i$) of the face image of the person dictionary data $D_i$ associated with Mr. "Taro Tanaka", and thus "Taro Tanaka" is displayed as "xxxxx" in the inquiry message 22 as shown in FIG. 4.

The response button icon 23 is used when the answer is affirmative, while the response button icon 24 is used when the answer is negative.

On the screen shown in FIG. 4, if the user clicks the response button icon 23 by using the operation input unit 8 to respond affirmatively, the display information generator 13 supplies information indicating the name obtained as the result of the face recognition to the dictionary data producing/updating unit 15 and instructs the dictionary data producing/updating unit 15 to perform the dictionary data production/update process using the captured face image. The dictionary data producing/updating unit 15 produces/updates the person dictionary data $D_i$ stored in the face recognition dictionary database 10 corresponding to the name received as the person identification information, as will be described in further detail later.

Figure 5:
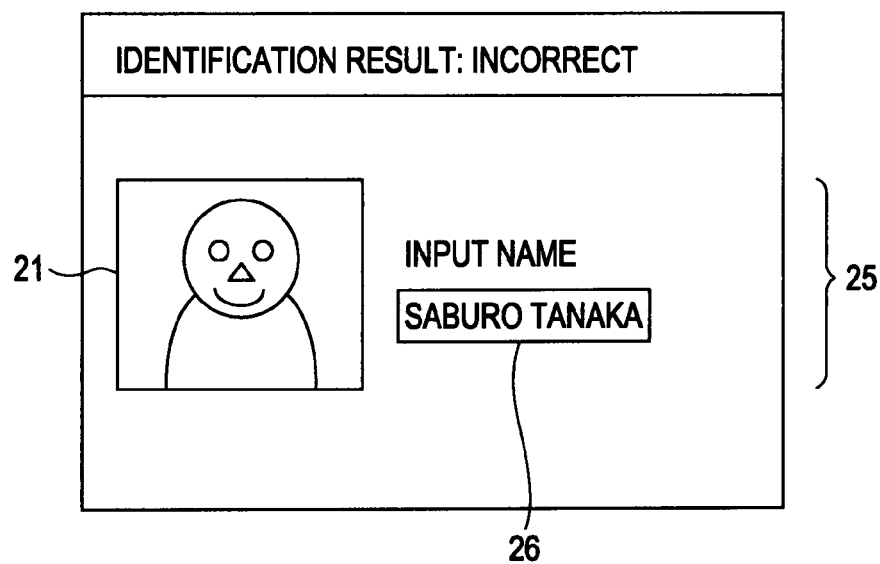
FIG. 5 is a diagram for explaining an example of a face recognition process performed by a person identification apparatus according to an embodiment of the present invention.

On the screen shown in FIG. 4, if the user clicks the response button icon 24 by using the operation input unit 8 to respond negatively, the display information generator 13 produces display information of an incorrect face recognition notification screen, such as that shown in FIG. 5, to inform the user that the face recognition result is incorrect, and display information generator 13 supplies the produced display information to the display 9 via the display interface 6. The display 9 displays the incorrect face recognition notification screen on the display screen in accordance with the received display information.

On the incorrect face recognition notification screen, as shown in FIG. 5, an image 21 of the captured face image Fin is displayed, and, in addition, a message 25 is displayed to prompt the user to input the correct name of the captured face image Fin. In response, the user inputs the name of the person, whose face image is displayed as the image 21, in a name field 26 in the message field 25.

If the user inputs the name, the display information generator 13 supplies information on the input name to the dictionary data producing/updating unit 15 and instructs the dictionary data producing/updating unit 15 to start the dictionary data production/update process using the captured face image Fin. The dictionary data producing/updating unit 15 checks the total score (described later) to determine whether it is necessary to update/produce the person dictionary data $D_i$ stored in the face recognition dictionary database 10 corresponding to the name received as the person identification information, as will be described in further detail later. If it is determined that it is necessary to perform the update/production process, the dictionary data producing/updating unit 15 updates/produces the person dictionary data Di.

In a case where the user issues a command to end the face recognition process without inputting a name in the name field 26, the display information generator 13 supplies no information on the name but supplies a message to the dictionary data producing/updating unit 15 to inform that updating/producing of the dictionary data is not necessary. In this case, the dictionary data producing/updating unit 15 does not update/produce the dictionary data.

Figure 6:
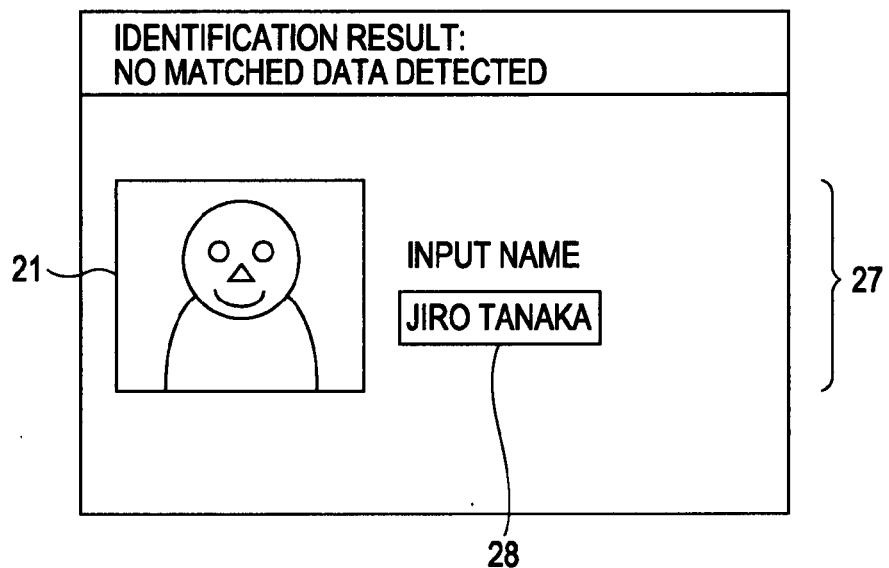
FIG. 6 is a diagram for explaining an example of a face recognition process performed by a person identification apparatus according to an embodiment of the present invention.

In a case where the display information generator 13 receives, from the face recognition unit 12, the message indicating that person dictionary data corresponding to the captured face image is not found in the dictionary database 10 in the face recognition process, the display information generator 13 produces display information of a screen such as that shown in FIG. 6 to inform the user that no corresponding person dictionary data is found in the face identification process, and display information generator 13 supplies the produced display information to the display 9 via the display interface 6. The display 9 displays the received display information on the display screen.

On the screen shown in FIG. 6, the image 21 of the captured face image Fin is displayed, and, in addition, a message 27 is displayed to prompt the user to input the name of the captured face image Fin. In response, the user inputs the name of the person, whose face image is displayed as the image 21, in a name field 28 in the message field 27.

If the user inputs the name, the display information generator 13 supplies information on the input name to the dictionary data producing/updating unit 15 and instructs the dictionary data producing/updating unit 15 to perform the dictionary data production/update process using the captured face image. The dictionary data producing/updating unit 15 checks the total score (described later) to determine whether it is necessary to update/produce the person dictionary data $D_i$ corresponding to the name received as the person identification information, as will be described in further detail later. If it is determined that it is necessary to perform the update/production process, the dictionary data producing/updating unit 15 updates/produces the person dictionary data Di.

If the user issues a command to end the face recognition process without inputting a name in the name field 28, the display information generator 13 supplies no information on the name but supplies a message to the dictionary data producing/updating unit 15 to inform that updating/producing of the dictionary data is not necessary. In this case, the dictionary data producing/updating unit 15 does not update/produce the dictionary data.

Figure 7:
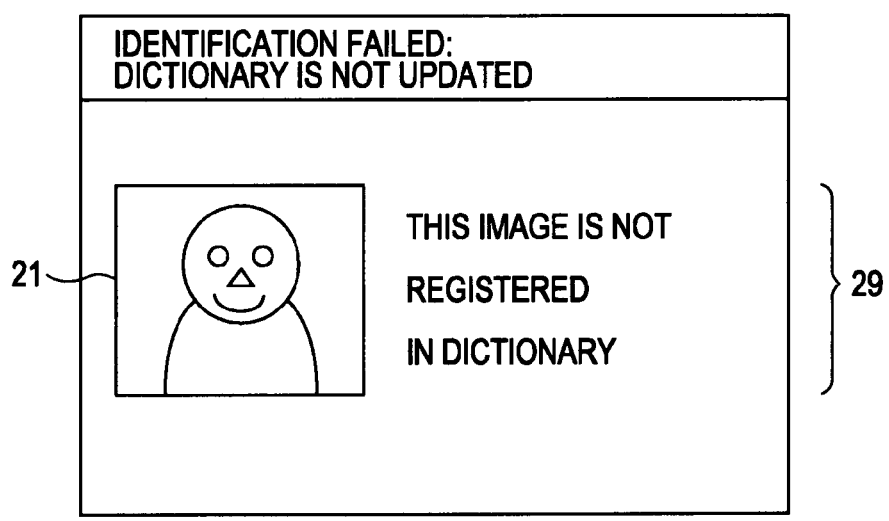
FIG. 7 is a diagram for explaining an example of a face recognition process performed by a person identification apparatus according to an embodiment of the present invention.

In a case where the display information generator 13 receives, from the face recognition image processing unit 11, a message indicating that a failure has occurred in the detection of a face or eyes or in the calculation of the feature vector, the display information generator 13 produces display information of an identification failure notification screen such as that shown in FIG. 7, and supplies the produced display information to the display 9 via the display interface 6. The display 9 displays the received display information on the screen of the display 9.

On the identification failure notification screen, as shown in FIG. 7, a message 29 is displayed to indicate that the captured face image is not used in updating of the dictionary. The display information generator 13 then supplies a message to the dictionary data producing/updating unit 15 to notify that updating of the dictionary is not performed.

In a case where the score calculation unit 14 receives data associated with the detected face and eyes from the face recognition image processing unit 11, and calculates the score indicating the reliability of the face image extracted from the image captured via the image data input interface 7. In a case where the score calculation unit 14 receives, from the face recognition image processing unit 11, a message indicating that a failure has occurred in the detection of a face or eyes or in the calculation of the feature vector, the score calculation unit 14 does not perform the calculation of the score of the captured face image.

In the present embodiment, the score calculation unit 14 calculates the score indicating the reliability of the captured face image subjected to the face recognition by detecting a deviation of the face image subjected to the face recognition from the standard conditions.

For example, the standard conditions in terms of the face image subjected to the face recognition are (A) the number of pixels of the data of the face image should be equal to or greater than a predetermined value in horizontal and vertical directions (in the present embodiment, the number of pixels should be equal to or greater than 64 pixels in both horizontal and vertical directions), (B) the face should be viewed exactly from front, and (C) two eyes should lie on a horizontal line.

In the present embodiment, four scores Sa, Sb, Sc and Sd are calculated for the feature data of the captured face image with respect to the standard condition, and then the total score SO for the feature data of the captured face image is calculated from the four scores Sa, Sb, Sc, and Sd. Each of the scores Sa, Sb, Sc, and Sd takes a value from 0 to 1. When the reliability is at a lowest level, the score is set to "0". The higher the reliability, the higher value the score is set to. When the reliability is at a highest level, the score is set to "1". The scores Sa, Sb, Sc, and Sd are described in further detail below.

Score Sa in Terms of Data Size of Face Image

Of the four scores, the score Sa indicates the reliability in terms of the data size of the face image detected from the captured image.

Figure 8:
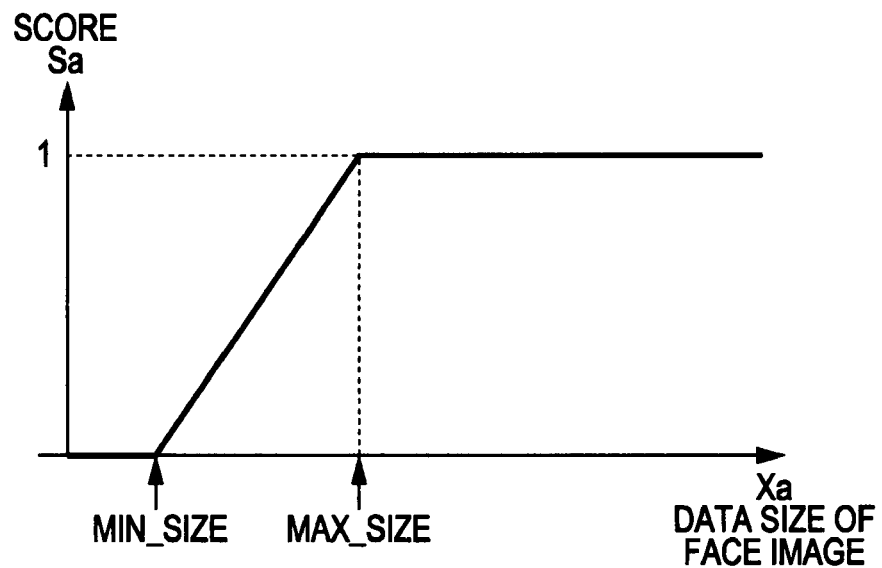
FIG. 8 illustrates a manner of calculating a score for a face image in a person identification apparatus according to an embodiment of the present invention.

In the standard condition (A) in terms of the face image subjected to the face recognition, if a minimum data size of the face image required in the face recognition is denoted by MIN_SIZE, and a data size of the face image sufficiently large for the face recognition is denoted by MAX_SIZE, the score Sa is calculated from the data size Xa of the captured face image relative to MIN_SIZE and MAX_SIZE as shown in FIG. 8.

As shown in FIG. 8, when Xa<MIN_SIZE, Sa=0.

When MIN_SIZE≦Xa≦MAX_SIZE, Sa=k·Xa, where k is a positive proportionality constant (that is, k>0).

When MAX_SIZE<Xa, Sa=1.

In the present embodiment, MIN_SIZE is set to be equal to 64×64 pixels, and MAX_SIZE is set to a value which is greater than 64×64 pixels and which is sufficiently large to perform face recognition.

Note that the data size of the captured face image refers to the data size of the face image detected from the original image captured via the image data input interface 7, and it is different from the data size of the face image subjected to the image processing such as the data interpolation performed by the face recognition image processing unit 11.

In the face recognition process performed by the face recognition image processing unit 11, the face image data needs to have a data size equal to or greater than the predetermined lower limit (64×64 pixels, in the present example). If the data size of the detected face image is smaller than the lower limit, data interpolation is performed to obtain a face image with a data size equal to or greater than the lower limit, and it is tried to detect a feature vector from the resultant face image. When the detected face image is rotated such that two eyes come to locations on a horizontal line, interpolation may be performed if necessary. If a feature vector is extracted from the face image obtained via the interpolation, there is a possibility that the face identification is correctly performed from the resultant feature vector.

Note that the score Sa described above is calculated based on the data size of the face image which is not yet subjected to the pixel interpolation performed by the face recognition image processing unit 11.

In the present embodiment, when the data size Xa of the face image is smaller than MIN_SIZE, it is determined that it is very difficult to obtain a feature vector with reliability high enough for the face recognition, and Sa is set to 0. On the other hand, if the data size Xa of the face image is greater than MAX_SIZE, it is determined that it is possible to obtain a feature vector with reliability high enough for the face recognition, and Sa is set to 1. When the data size Xa of the face image is greater than MIN_SIZE and smaller than MAX_SIZE, it is determined that the reliability of the feature vector used in the face recognition is proportional to the data size Xa, and thus the score Sa is set to a value proportional to the data size Xa.

In the example shown in FIG. 8, when the data size Xa of the face image is greater than MIN_SIZE and smaller than MAX_SIZE, the score Sa indicating the reliability of the feature vector used in the face recognition is linearly changed with the data size Xa. Alternatively, the score Sa may be changed nonlinearly with the data size Xa. For example, the score Sa may be changed with the squared of Xa. Score Sb in terms of the orientation of the face image with respect to the front direction As described above, in the standard condition, the face image used in the face recognition is expected to be viewed exactly from front. In general, if the direction of the face image is deviated from the exact front direction beyond an allowable range, it becomes impossible to calculate the feature vector of the face image. Thus, in the present embodiment, the score Sb is calculated on the basis of the deviation of the direction of the face image from the exact front direction.

Thus, the score Sb indicates the reliability in terms of the calculation of the feature vector of the face image.

Figure 9:
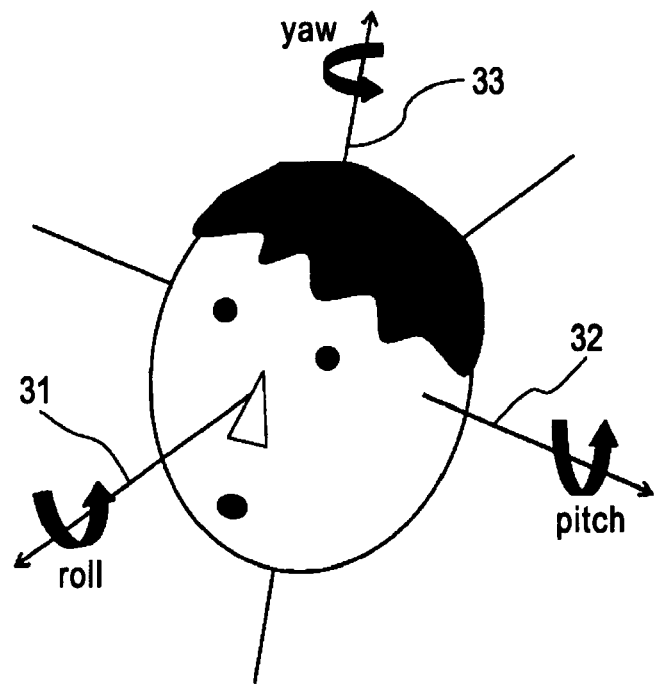
FIG. 9 is a diagram for explaining a process of calculating a score for a face image in a person identification apparatus according to an embodiment of the present invention.

As shown in FIG. 9, the orientation (angle) of a face can change in three directions described below. A change in a roll direction is rotation about a rotation axis 31 extending from the front of the face toward the back of the face. A change in a pitch direction is rotation about a rotation axis 32 extending in a horizontal direction perpendicular to the rotation axis 31. A change in a yaw direction is rotation about a rotation axis 33 extending in a vertical direction perpendicular to the rotation axis 31.

The change of the orientation in the roll direction is corrected by the face recognition image processing unit 11 by rotating the image such that two eyes come to locations on a horizontal line, and the face recognition is performed for the resultant face image. Therefore, in the present embodiment, the change in the roll direction is not taken into account in the calculation of the score Sb.

Therefore, in the present embodiment, the score Sb is calculated taking into account only the change in the orientation in the pitch direction and yaw direction. In the present embodiment, if the deviation of the orientation of the face image from the exact front direction is so large that the feature vector cannot be calculated for the face image, the score Sb is set to 0. In a case where the deviation of the orientation of the face image from the exact front direction is, in both pitch and yaw directions, within a small range which allows the feature vector of the face image to be calculated, the score Sb is set to 1.

In the present embodiment, if the angle of the deviation, in the pitch direction, of the orientation of the face image from the front direction is denoted by $A_{pitch}$, and the angle of the deviation in the yaw direction is denoted by $A_{yaw}$, the allowable range which allows the feature vector of the face image to be calculated is given, for example, by $$-15° \leq A_{pitch} \leq +15°$$

$$-15° \leq A_{yaw} \leq +15°$$

Thus, in the present embodiment, when $-15° \leq A_{pitch} \leq +15°$ and $-15° \leq A_{yaw} \leq +15°$, the score Sb is set to 1. However, if the above condition is not satisfied, the score Sb is set to 0. Score Sc in Terms of the Smallness of Rotation in the Roll Direction The score Sc indicates the reliability of the face image in the face recognition in terms of the smallness of rotation in the roll direction. Thus, the score calculation unit 14 calculates the score Sc based on the face image which is not yet subjected to the correction of the rotation n the roll direction.

Figure 10:
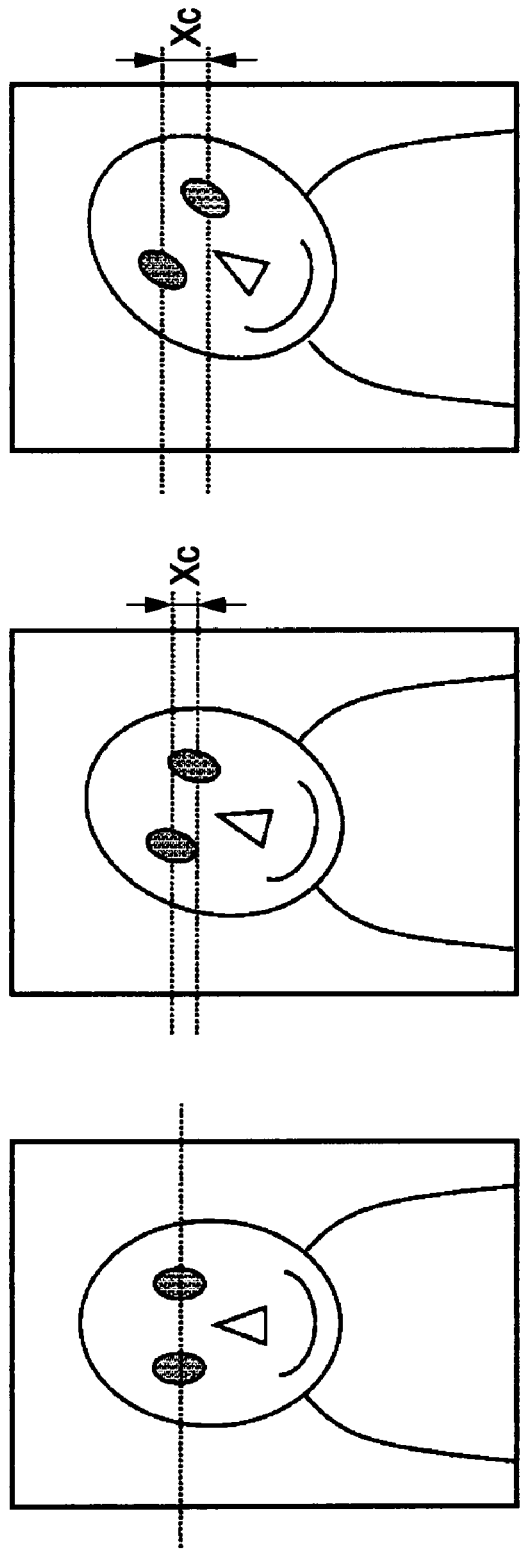
FIGS. 10A to 10C are diagrams for explaining a process of calculating a score for a face image in a person identification apparatus according to an embodiment of the present invention.

In the present embodiment, as shown in FIG. 10, the deviation in the roll direction is defined as the vertical distance Xc, in the face image not subjected to rotation, between two eyes detected in the part detection process (the deviation from a horizontal line on which two eyes ideally lie, or the distance between the position (height) of a left eye measured in the vertical direction and the position (height) of a right eye measured in the vertical direction).

More specifically, in a case where detected two eyes are on a horizontal line as shown in FIG. 10A, the vertical distance Xc between the two eyes is equal to 0 (Xc=0). On the other hand, in a case where the detected face image has a deviation of orientation in the roll direction as shown in FIG. 10B or 10C, the vertical distance Xc between the detected two eyes has a value corresponding to the amount of rotation in the roll direction.

Figure 11:
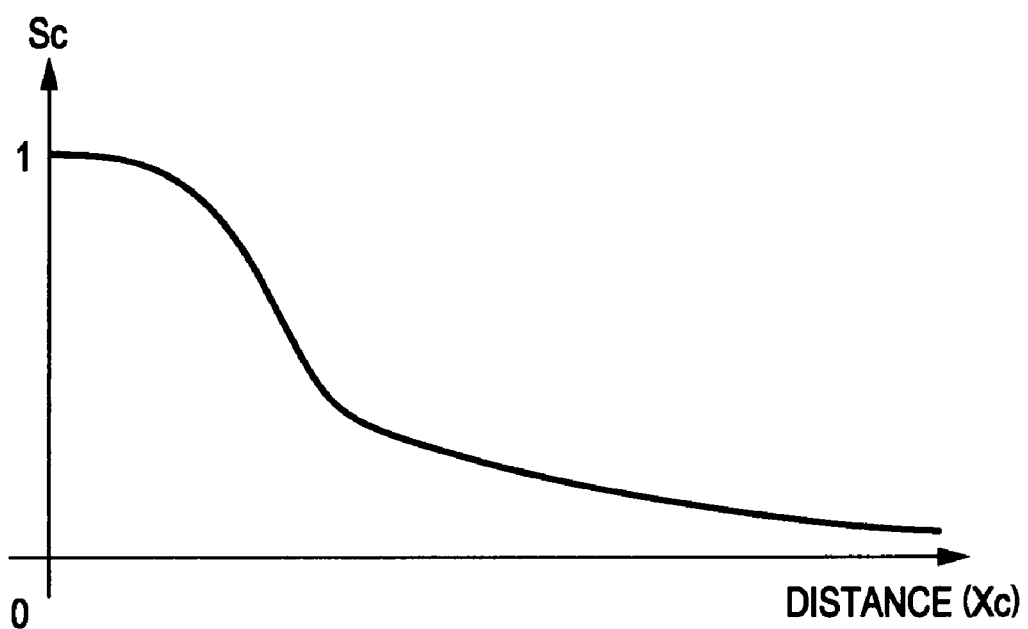
FIG. 11 is a diagram for explaining a process of calculating a score for a face image in a person identification apparatus according to an embodiment of the present invention.

When the two eyes are on a horizontal line, that is, when the vertical distance Xc between the two eyes is equal to 0, the score Sc has a maximum value, that is, Sc=1. The score Sc decreases toward a minimum value of 0 with increasing vertical distance Xc between the two eyes. In the present embodiment, the score Sc has a value given by a Gaussian distribution function of the vertical distance Xc between the two eyes as shown in FIG. 11.

More specifically, the score Sc is calculated according to formula (1) described below.

$$Sc = \frac{1}{\sqrt{2\pi}\delta} \exp\left(-\frac{(Xc - \mu)^2}{2\delta^2}\right) \times b \quad (1)$$

where b is a value determined so that Sc=1 when Xc=0, $\delta$ is the standard deviation, and $\mu$ is the average value. The values of these parameters are statistically determined from a large number of samples of face images.
Score Sd in Terms of the Smallness of the Rotation in the Yaw Direction In the above-described calculation of the score Sb, if the rotation of the face image in the yaw direction from the front direction is within the allowable range, and if the rotation in the pitch direction is also within the allowable range, the score Sb is set to 1 regardless of the magnitude of rotation within the allowable range.

When the deviation of the orientation in the yaw direction is within the allowable range, in order to more precisely evaluate the effect of the rotation in the yaw direction on the reliability in identification of the captured face image, the score Sd is defined as follows.

That is, in the present embodiment, as shown in FIGS. 12A to 12C, the deviation in the yaw direction of the orientation of the face image from the front direction is defined by the distance Xd from a center line 41 of the face image (a line extending in parallel with the rotation axis 33 of the yaw (FIG. 9) and passing through a middle point of a horizontal line between right and left edges 40 of the face image at a height corresponding to locations of eyes) to the middle point 42 between the detected two eyes.

Note that the middle point 42 between the two eyes is at the same location regardless of whether the correction of the rotation in the roll direction has been made or not. In the present embodiment, the score calculation unit 14 calculates the distance Xd on the basis of the face image which is not yet subjected to the correction of rotation in the roll direction.

If the middle point 42 between the detected two eyes is on the center line 41 of the face image as in the example shown in FIG. 12A, Xd=0. In this case, the orientation of the face image is in the front direction, and it is expected that a high-reliability feature vector can be extracted from the face image, and thus the score Sd is set to 1 (Sd=1).

Figure 13:
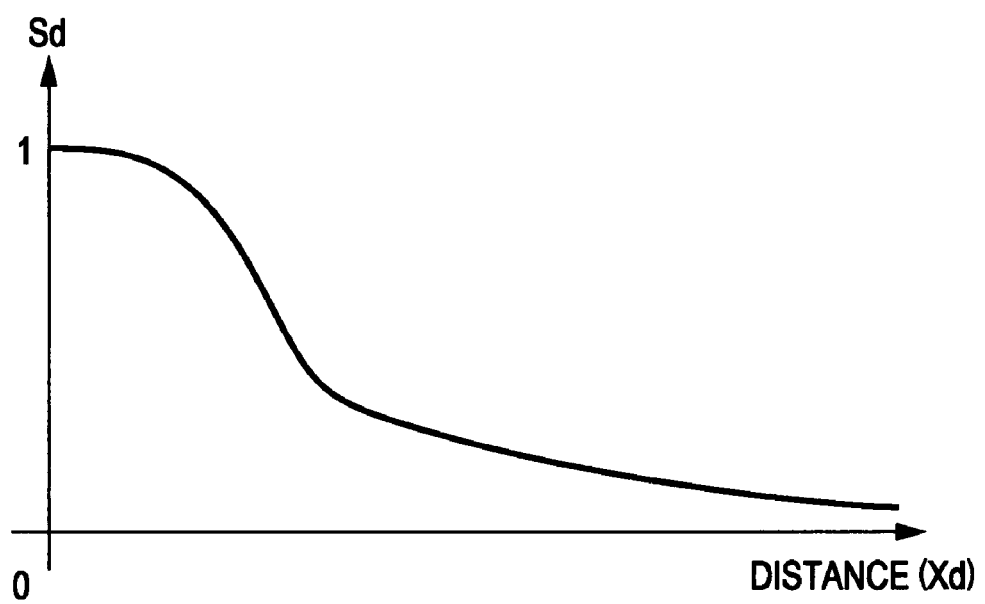
FIG. 13 is a diagram for explaining a process of calculating a score for a face image in a person identification apparatus according to an embodiment of the present invention.

As shown in FIGS. 12B and 12C, the score Sd decreases toward 0 with increasing distance Xd between the middle point 42 between the detected two eyes and the center line 41 of the face image. In the present embodiment, the score Sd has a value given by a Gaussian distribution function of the distance Xd between the center line 41 of the face image and the middle point 42 between the detected two eyes as shown in FIG. 13.

More specifically, the score Sd is calculated according to formula (2) shown below.

$$Sd = \frac{1}{\sqrt{2\pi}\delta} \exp\left(-\frac{(Xd-\mu)^2}{2\delta^2}\right) \times c \qquad (2)$$

where c is a value determined so that Sd=1 when Xd=0, δ is the standard deviation, and μ is the average value. The values of these parameters are statistically determined from a large number of samples of face images.

Total Score

In the present embodiment, the score calculation unit 14 calculates the total score SO from the four scores Sa, Sb, Sc, and Sd according to equation (3). Herein, because the score calculation unit 14 calculates the total score for data of a newly captured face image, the total score calculated by the score calculation unit 14 is denoted as SOnew.

$$SOnew = Sa \times Sb \times Sc \times Sd \qquad (3)$$

Note that equation (3) is an example of a manner in which the total score SOnew is determined, and the total score SOnew may be determined differently. For example, the total score may be calculated as follows.

$$SOnew = Sa + Sb + Sc + Sd \qquad (4)$$

Still alternatively, the total score may be calculated as follows.

$$SOnew = ka \cdot Sa \times kb \cdot Sb \times kc \cdot Sc \times kd \cdot Sd \qquad (5)$$

or $$SOnew = ka \cdot Sa + kb \ldots Sb + kc \ldots Sc + kd \cdot Sd \qquad (6)$$

where ka, kb, kc, and kd are weighting factors respectively assigned to the scores Sa, Sb, Sc, and Sd.

Weighting Factor W of Feature Vector of Face Image

The total score SO may be directly used in the updating of the face image recognition dictionary data $FRD_i$, or weighted weighting factor W for the feature vector of the face image may be determined, and the face image recognition dictionary data $FRD_i$ may be updated using the weighting factor W.

In the present embodiment, the score calculation unit 14 calculates the weighting factor Wnew for the feature vector of the newly captured face image from the total score SOnew.

More specifically, the weighting factor Wnew is determined to be linearly proportional to the total score SOnew according to formula (7) described below.

$$Wnew = k \cdot SOnew \qquad (7)$$

where k is a proportionality constant.

Note that in a case where k is set to 1, the total score SOnew is directly used as the weighting factor Wnew.

The manner of calculating the weighting factor Wnew is not limited to that based on formula (7), but the weighting factor Wnew may be determined differently. For example, the weighting factor Wnew is determined such that the weighting factor Wnew changes non-linearly with the total score SOnew. For example, the weighting factor Wnew may be given by formula (8) described below.

$$Wnew = k \cdot (SOnew)^2 \qquad (8)$$

Alternatively, the weighting factor Wnew may be determined as follows. When the total score SOnew is equal to or smaller than a predetermined first threshold value, the weighting factor Wnew is set to 0, while when the total score SOnew is greater than the predetermined first threshold value, the weighting factor Wnew is determined in accordance with formula (7) or (8).

Still alternatively, the weighting factor Wnew may be determined as follows. When the total score SOnew is equal to or smaller than a predetermined first threshold value, the weighting factor Wnew is set to 0. However, when the total score SOnew is greater than a predetermined second threshold value (which is greater than the first threshold value), the weighting factor Wnew is set to 1. When the total score SOnew is greater than the predetermined first threshold value and smaller than the second threshold value, the weighting factor Wnew is determined in accordance with formula (7) or (8).

As described above, the score calculation unit 14 calculates the total score SOnew for each captured face image, and further calculates the weighting factor Wnew based on the total score SOnew. The calculated total score SOnew and the weighting factor Wnew are supplied to the dictionary data producing/updating unit 15.

Updating of Face Recognition Dictionary Data $FRD_i$

In the present embodiment, when person identification information is determined as a result of the identification process performed by the face recognition unit 13, the dictionary data producing/updating unit 15 updates the dictionary data production information $DPI_{i,n}$ of the person dictionary data $D_i$ corresponding to the person identification information, and, using this updated dictionary data production information $DPI_{i,n}$, updates the face recognition dictionary data $FRD_i$ of the person dictionary data $D_i$ corresponding to the person identification information.

More specifically, the dictionary data producing/updating unit 15 compares the total score SOnew of the newly captured face image with each total score $SO_{i,n}$ of dictionary data production information $DPI_{i,n}$ already stored in the face recognition dictionary database 10 as the person dictionary data $D_i$ of the person $P_i$ corresponding to the newly captured face image to determine whether the face recognition dictionary database 10 includes dictionary data production information $DPI_{i,n}$ whose total score $SO_{i,n}$ is smaller than the total score SOnew of the newly captured face image, that is, whether the total score SOnew of the newly captured face image is greater than the total score of some of dictionary data production information $DPI_{i,n}$ stored in the face recognition dictionary database 10.

If the dictionary data producing/updating unit 15 determines that the total score SOnew of the newly captured face image is greater than that of some dictionary data production information $DPI_{i,n}$ stored in the face recognition dictionary database 10, the dictionary data producing/updating unit 15 updates the face recognition dictionary data $FRD_i$ of the person dictionary data Di.

In the updating of the face recognition dictionary data $FRD_i$, the dictionary data producing/updating unit 15 first deletes dictionary data production information $DPI_{i,n}$ with a smallest total score $SO_{i,n}$ from the person dictionary data $D_i$ of the face recognition dictionary database 10, and the dictionary data producing/updating unit 15 stores the feature vector, the time data, the weighting factor Wnew, and the total score SOnew of the new face image as the person dictionary data in the face recognition dictionary database 10.

Furthermore, the dictionary data producing/updating unit 15 updates the face recognition dictionary data $FRD_i$ according to formula (9) shown below.

$$FRDi = \frac{\sum_{n=1}^{N}(Wi,n \times Vi,n)}{\sum_{n=1}^{N} Wi,n} \quad (9)$$

That is, the dictionary data producing/updating unit 15 calculates the sum of products of the feature vector $V_{i,n}$ described in the N pieces of dictionary data production information $DPI_{i,1}$ to $DPI_{i,n}$ and the corresponding weighting factor $W_{i,n}$, and divides the resultant sum by the sum of N weighting factors. The result is stored as updated face recognition dictionary data $FRD_i$.

Because the face recognition dictionary data $FRD_i$ (corresponding to the feature vectors) is calculated using the N weighted dictionary data production information $DPI_{i,1}$ to $DPI_{i,n}$, and thus the face recognition dictionary data $FRD_i$ is better in accuracy than that obtained based on the simple average of feature vectors included in the N respective dictionary data production information $DPI_{i,1}$ to $DPI_{i,n}$ according to formula (10) shown below.

$$FRDi = \frac{\sum_{n=1}^{N} Vi,n}{N} \quad (10)$$

Besides, as a result of the updating, the N dictionary data production information $DPI_{i,1}$ to $DPI_{i,n}$ having most highest total scores are stored in the face recognition dictionary database 10, and thus the face recognition dictionary data $FRD_i$ is updated into a more accurate version.

In a case where it is determined that the total score SOnew of the newly captured face image is smaller than the total score SOnew of any dictionary data production information $DPI_{i,n}$ stored in the face recognition dictionary database 10, updating of the face recognition dictionary data $FRD_i$ of the person dictionary data $D_i$ is not performed, because replacing of the feature value of the dictionary data production information $DPI_{i,n}$ with the current feature value results in reduction in accuracy of the face recognition dictionary data $FRD_i$.

In a case where the number of dictionary data production information $DPI_{i,n}$ described in the person dictionary data $D_i$ in the face recognition dictionary database 10 is smaller than N, the dictionary data producing/updating unit 15 produces new face recognition dictionary data $FRD_i$ such that the feature vector, the time information, the total score SOnew, and the weighting factor Wnew associated with the newly captured face image are stored as new dictionary data production information $DPI_{i,n}$ in the face recognition dictionary database 10 without comparing the total score SOnew of the newly captured face image data with the total scores of dictionary data production information $DPI_{i,n}$ already existing in the face recognition dictionary database 10. In this case, in the production of the face recognition dictionary data $FRD_i$, the dictionary data producing/updating unit 15 uses the number of dictionary data production information $DPI_{i,n}$ included in the person dictionary data $D_i$ stored in the face recognition dictionary database 10 instead of N in formula (9).

If the number of dictionary data production information $DPI_{i,n}$ included in the person dictionary data $D_i$ stored in the face recognition dictionary database 10 reaches N, then in the updating of the face recognition dictionary data $FRD_i$ performed thereafter, the dictionary data producing/updating unit 15 compares the total score SOnew of the newly captured face image with the total score $SO_{i,n}$ of each dictionary data production information $DPI_{i,n}$, and updates the face recognition dictionary data $FRD_i$ using N pieces of dictionary data production information selected in the order from the highest total score to lower total score.

In the functional block configuration shown in FIG. 1, the face recognition image processing unit 11, the face recognition unit 12, the display information generator 13, the score calculation unit 14, and the dictionary data producing/updating unit 15 may be implemented by hardware or may be implemented in the form of software functional blocks which are implemented by the CPU 1 by executing a software program stored in the ROM 3 using the RAM 4 as a work area.

In the embodiment described above, each dictionary data production information $DPI_{i,n}$ includes at lest a feature vector, time information, a total score, and a weighting factor. The dictionary data production information $DPI_{i,n}$ may not include a weighting factor, and the weighting factor may be calculated from the total score.

Instead of storing the feature vector, the captured face image data may be stored, and the feature vector may be extracted from the stored face image data. In this case, the total score and the weighting factor may be calculated from the stored face image data. Thus, in this case, the dictionary data production information $DPI_{i,n}$ includes at least face image data.

Operation of Face Image Recognition Apparatus

Face Recognition Process

The face recognition process, the process of calculating the feature data of the captured face image, and the process of producing/updating the face recognition dictionary data performed by the face image recognition apparatus configured in the above-described manner is described below.

Figure 14:
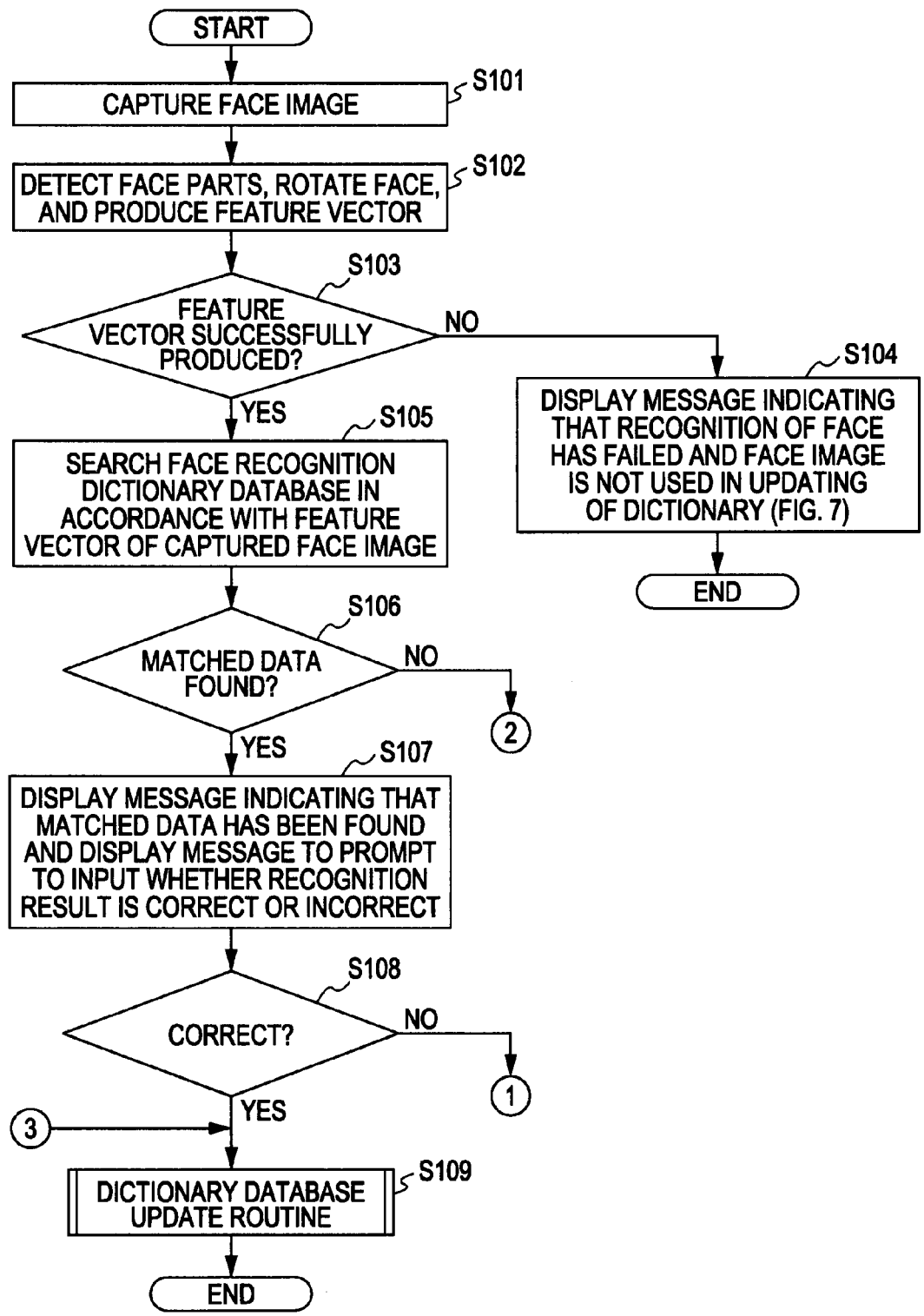
FIG. 14 is a flow chart illustrating a part of a face recognition process performed by a person identification apparatus according to an embodiment of the present invention.
Figure 15:
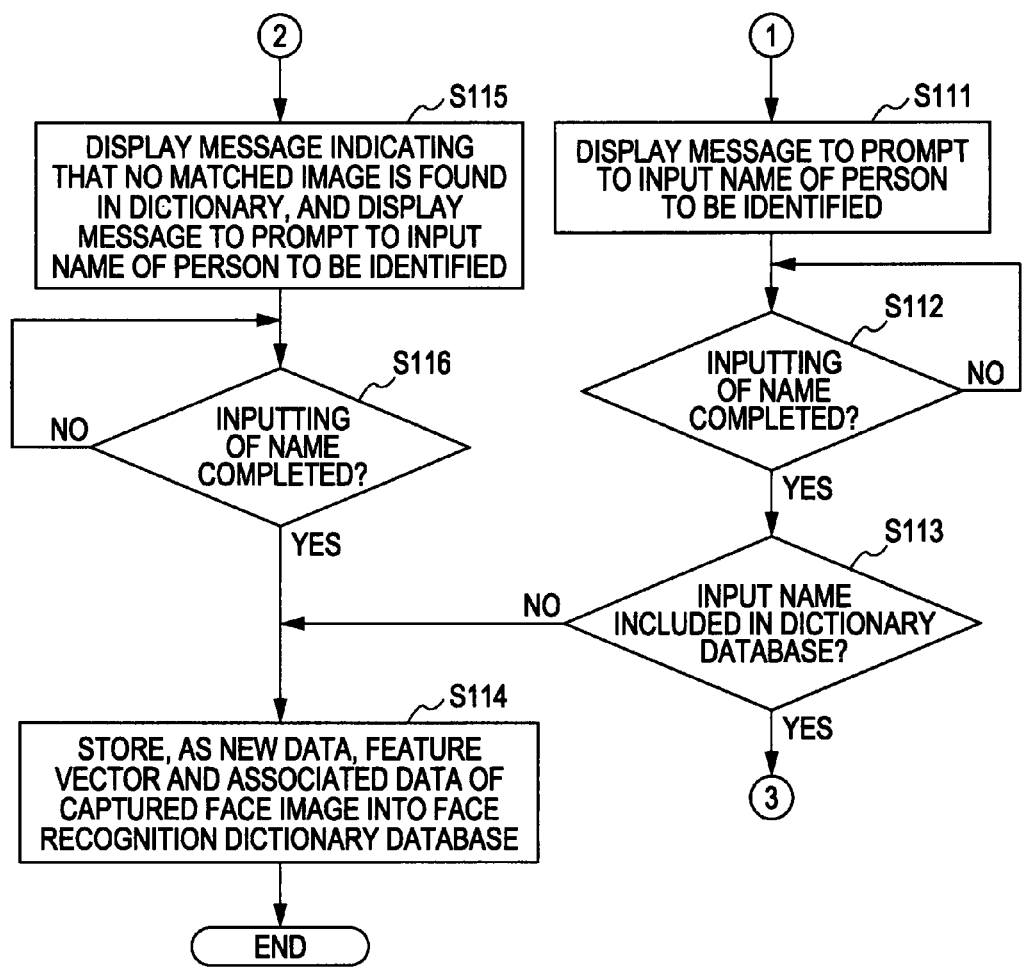
FIG. 15 is a flow chart illustrating another part of the face recognition process performed by the person identification apparatus according to the embodiment of the present invention.

FIG. 14 is a flow chart illustrating a part of the face recognition process, and FIG. 15 is a flow chart illustrating a part following the part shown in FIG. 14. Note that the process shown in FIG. 14 and FIG. 15 is performed, under the control of the CPU 1, by the image data input interface unit 7, the face recognition image processing unit 11, the face recognition unit 12, and the display information generator 13.

As described above, these functional blocks may be implemented in the form of software functional blocks performed by the CPU 1 by executing a software program stored in the ROM 3 using the RAM 4 as a work area.

First, the CPU 1 acquires image data including a face image and associated information including Exif information via the image data input interface 7, and transfers them to the face recognition image processing unit 11 (step S101).

In response to a process start command issued by the CPU 1, the face recognition image processing unit 11 detects a face and eyes from received image data, and rotates the face image with respect to the positions of the detected eyes. The face recognition image processing unit 11 then plots feature points and produces a feature vector from the plotted feature points (step S102). In the above process, information indicating the time at which the image was taken is extracted from the Exif information associated with the image data, and the extracted time information is stored.

If the face recognition image processing unit 11 has successfully produced by the feature vector, the face recognition image processing unit 11 outputs the produced feature vector and information indicating that the feature vector has been successfully produced. However, if the face recognition image processing unit 11 fails to produce the feature vector because the data size of the face image data is too small or for some reason, the face recognition image processing unit 11 outputs information indicating that the face recognition image processing unit 11 has failed to produce the feature vector.

The CPU 1 determines checks the information supplied from the face recognition image processing unit 11 to determine whether the feature vector of the captured face image has been successfully produced (step S103). In a case where the CPU 1 receives, from the face recognition image processing unit 11, the information indicating that the production of the feature vector of the face image has failed, the CPU 1 transfers this information to the display information generator 13.

If the display information generator 13 receives the information indicating the failure of the production of the feature vector of the face image, the display information generator 13 produces display information of the identification failure notification screen shown in FIG. 7 and outputs the produced display information. The CPU 1 sends the display information of the identification failure notification screen to the display 9 via the display interface 6 to display the identification failure notification screen including a message 29 indicating that the identification using the captured face image has failed and thus the face image is not used in the dictionary as shown in FIG. 7 (step S104).

In a case where the CPU 1 determines in step S103 that the information received from the face recognition image processing unit 11 indicates that the feature vector of the face image has been successfully produced, and the produced feature vector has been received, the CPU 1 transfers the produced feature vector and the information indicating the feature vector has been successfully produced to the face recognition unit 12.

The face recognition unit 12 searches the face recognition dictionary database 10 according to the received feature vector of the captured face image to detect face recognition dictionary data $FRD_i$ having an identical feature vector. If face recognition dictionary data $FRD_i$ having an identical feature vector is found, the face recognition unit 12 outputs person identification information (a name of a person, in the present embodiment) corresponding to the detected face recognition dictionary data $FRD_i$ together with information indicating that face recognition dictionary data $FRD_i$ having the identical feature vector has been found. However, if no face recognition dictionary data $FRD_i$ having an identical feature vector is found, the face recognition unit 12 outputs information indicating that no face recognition dictionary data $FRD_i$ having an identical feature vector is found (step S105).

CPU 1 checks the information output from the face recognition unit 12 to determine whether face recognition dictionary data $FRD_i$ having an identical feature vector has been found (step S106). If it is determined that face recognition dictionary data $FRD_i$ having an identical feature vector has been found, the CPU 1 transfers the information indicating the name of a person as the person identification information corresponding to the detected face recognition dictionary data $FRD_i$ received from the face recognition unit 12 together with the information indicating that the face has been successfully identified to the display information generator 13.

If the display information generator 13 receives the information indicating that the face has been successfully identified, and the information indicating the name of the person, the display information generator 13 produces display information of a face recognition result confirmation screen, such as that shown in FIG. 4, which makes it possible for a user to confirm the face recognition result. The CPU 1 sends the display information of the face recognition result confirmation screen to the display 9 via the display interface 6 to display the face recognition result confirmation screen including a message asking the user whether the face recognition result is correct (step S107).

The CPU 1 waits for a user to input information indicating whether the face recognition result is correct or not via the screen shown in FIG. 4. If the user inputs information, the CPU 1 analyzes the input information to determine whether the input information indicates that the face recognition result is correct (step S108). If the determination made by the CPU 1 is that the input information indicates that the face recognition result is correct, the CPU 1 performs a routine of updating the face recognition dictionary database 10 (step S109). The details of the routine of updating the face recognition dictionary database 10 will be described later.

On the other hand, in a case where the determined made in step S108 is that the input information indicates that the face recognition result is incorrect, the CPU 1 sends information indicating this fact to the display information generator 13. In accordance with the received information, the display information generator 13 produces display information of an incorrect face recognition notification screen such as that shown in FIG. 5. The CPU 1 sends the display information to the display 9 via the display interface 6 to display the display information including a message 25 prompting the user to input the correct name of the captured face image displayed on the screen (step S111 in FIG. 15).

The CPU 1 waits for the user to input the name of the person in a name field 26 in the message 25 (step S112). If the name is input, the CPU 1 determines whether the face recognition dictionary database 10 includes person dictionary data $D_i$ corresponding to the input name (step S113). If it is determined that the face recognition dictionary database 10 includes person dictionary data $D_i$ corresponding to the input name, then the process jumps to step S109 to perform the routine of updating the face recognition dictionary database 10.

On the other hand, if it is determined in step S113 that person dictionary data $D_i$ corresponding to the input name is not found in the face recognition dictionary database 10, the CPU 1 produces new person dictionary data $D_i$ corresponding to person identification information given by the input name, and stores person dictionary data $D_i$ in association with the person identification information into the face recognition dictionary database 10 thereby registering the new person dictionary data $D_i$ (step S114). The new registered person dictionary data $D_i$ includes, as shown in FIG. 2, the feature vector of the captured face image, the time information indicating the time at which the face image was captured, the total score, and the weighting factor. Because there is only one feature vector for the face image captured for the first time, the feature vector is also registered as face recognition dictionary data.

The process of registering new person dictionary data $D_i$ in the face recognition dictionary database 10 may be performed as a part of the process of updating the face recognition dictionary database 10 which will be described in detail later.

In a case where it is determined in step S106 that face recognition dictionary data $FRD_i$ having a feature vector identical to the feature vector of the captured face image is not found, the CPU 1 sends information indicating this fact to the display information generator 13. If the display information generator 13 receives the information indicating that face recognition dictionary data $FRD_i$ having an feature vector identical to the feature vector of the captured face image is not found, the display information generator 13 produces display information of a screen such as that shown in FIG. 6 for notifying the user that no face recognition dictionary data $FRD_i$ corresponding to the face image is found. The CPU 1 sends the display information to the display 9 via the display interface 6 to display the display information including a message 27 prompting the user to input the name of the captured face image displayed on the screen as shown in FIG. 6 (step S115 in FIG. 15).

The CPU 1 waits for the user to input the name in a name field 28 in the message 27 (step S116). If the name is input, the CPU 1 produces new person dictionary data $D_i$ corresponding to person identification information given by the input name, and stores person dictionary data $D_i$ in association with the person identification information into the face recognition dictionary database 10 thereby registering the new person dictionary data $D_i$ (step S114).

Updating of Face Recognition Dictionary Database

Figure 16:
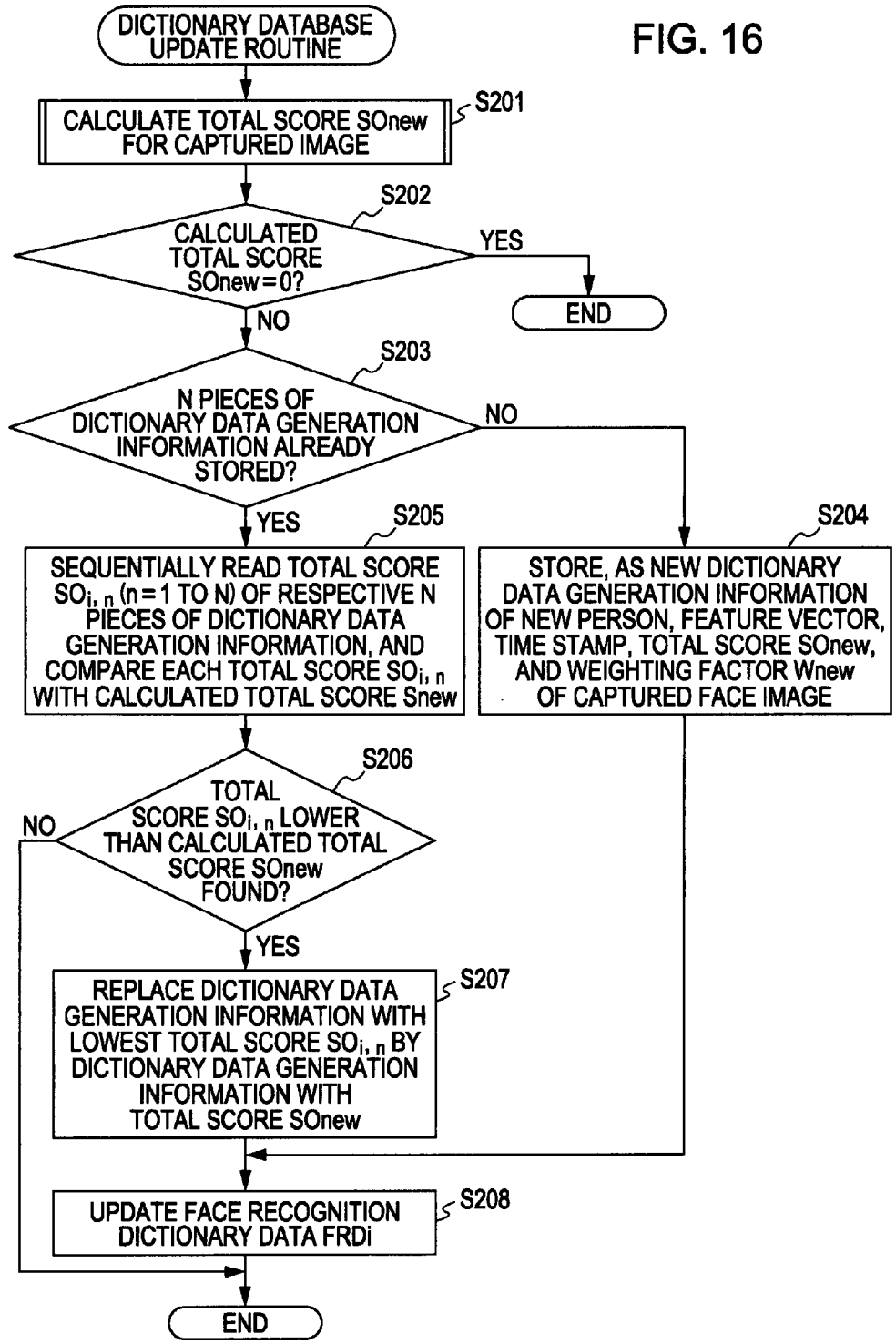
FIG. 16 is a flow chart illustrating a process of updating face recognition dictionary data, performed by a person identification apparatus according to an embodiment of the present invention.

The details of the process, in step S109 in FIG. 14, of updating the face recognition dictionary database are described below. FIG. 16 is a flow chart illustrating an example of the process of updating the face recognition dictionary database. Note that the sequence of steps shown in FIG. 16 is performed by the score calculation unit 14 and the dictionary data producing/updating unit 15 under the control of the CPU 1. These functional blocks, that is, the score calculation unit 14 and the dictionary data producing/updating unit 15 may be implemented in the form of software functional blocks performed by the CPU 1 by executing a software program stored in the ROM 3 using the RAM 4 as a work area.

First, the CPU 1 sends a command to the score calculation unit 14 to start the calculation of the total score SOnew. In response, the score calculation unit 14 calculates the total score SOnew and the weighting factor Wnew in the manner described above, and outputs the calculation result (step S201). The details of the process of calculating the total score SOnew and the weighting factor Wnew will be described later. The CPU 1 transfers the calculated total score SOnew and the weighting factor Wnew to the dictionary data producing/updating unit 15.

In a case the score calculation unit 14 is implemented in the form of a hardware unit as in the present embodiment, when the face recognition image processing unit 11 has successfully produced a feature vector, data indicating the detected face image and data indicating the detected eyes may be supplied to the score calculation unit 14, and the score calculation unit 14 may calculate the total score SOnew and the weighting factor Wnew in parallel to the face recognition process. In this case, by a time at which the dictionary database 10 is updated, the total score SOnew and the weighting factor Wnew have been calculated by the score calculation unit 14, and the results have been stored in the work area RAM 4. Thus, in step S201, the CPU 1 reads the total score SOnew and the weighting factor Wnew from the work area RAM 4 and transfers them to the dictionary data producing/updating unit 15.

The dictionary data producing/updating unit 15 determines whether the total score SOnew calculated (obtained) in step S201 for the feature vector of the captured face image is equal to 0 (SOnew=0) (step S202). If SOnew=0, the dictionary data producing/updating unit 15 notifies the CPU 1 that SOnew=0. If the CPU 1 receives this notification, the CPU 1 determines that the feature vector of the captured face image is low in the reliability and thus this feature vector should not be used in updating of the dictionary data. In this case, the present routine is ended.

In a case where it is determined in step S202 that SOnew≠0, the dictionary data producing/updating unit 15 determines whether the number of pieces of already existing dictionary data production information $DPI_{i,n}$ associated with the person correctly identified or the person whose name was input by the user via the screen shown in FIG. 5 or 6 has reached the upper limit (N pieces, in the present embodiment) (step S203).

In a case where it is determined the number of pieces of already existing dictionary data production information $DPI_{i,n}$ is smaller than N, the dictionary data producing/updating unit 15 adds, to the face recognition dictionary database 10, new dictionary data production information $DPI_{i,n}$ including the feature vector of the captured face image, the time information, the total score SOnew and the weighting factor Wnew associated with the person (the person correctly identified in the face recognition process or the person whose name was input by the user via the screen shown in FIG. 5 or 6 (hereinafter, the "identified person" will denote such a person)). (step S204).

The dictionary data producing/updating unit 15 calculates the face recognition dictionary data $FRD_i$ associated with the identified person according to formula (9) described above, thereby updating the face recognition dictionary data $FRD_i$ (step S208). Note that in this case, because the number of pieces of dictionary data production information $DPI_{i,n}$ is smaller than N, N in formula (9) is replaced with the number of pieces of dictionary data production information $DPI_{i,n}$.

In a case where it is determined in step S203 that the number of pieces of already existing dictionary data production information $DPI_{i,n}$ is equal to N, the dictionary data producing/updating unit 15 sequentially reads the total scores $SO_{i,n}$ of the respective N pieces of dictionary data production information $DPI_{i,n}$ associated with the identified person, and sequentially compares the total scores $SO_{i,n}$ with the total score SOnew calculated for the captured face image (step S205).

The dictionary data producing/updating unit 15 determines whether there is a total score smaller than the calculated total score SOnew of the captured face image in the total scores $SO_{i,n}$ of the N pieces of dictionary data production information $DPI_{i,n}$ (step S206). If no such total scores $SO_{i,n}$ is found, it is determined that updating of the dictionary data is not necessary, and thus the present processing routine is ended.

On the other hand, in case where it is determined in step S206 that there is a total score smaller than the calculated total score SOnew of the captured face image in the total scores $SO_{i,n}$ of the N pieces of dictionary data production information $DPI_{i,n}$, the dictionary data producing/updating unit 15 detects dictionary data production information $DPI_{i,n}$ having a smallest total score $SO_{i,n}$ from the N pieces of dictionary data production information $DPI_{i,n}$, and replaces the detected dictionary data production information $DPI_{i,n}$ having the smallest total score $SO_{i,n}$ with new dictionary data production information including the feature vector of the face image having the total score SOnew, the time information, the total score, and the weighting factor (step S207).

As a result of the replacement performed in step S207, a change has occurred in content of the N pieces of dictionary data production information $DPI_{i,n}$. Thus, the face recognition dictionary data $FRD_i$ is recalculated using the feature values and the weighting factors of the N pieces of dictionary data production information $DPI_{i,n}$ according to formula (9) described above thereby updating the face recognition dictionary data $FRD_i$ (step S208).

Thus, the routine of updating the dictionary database is completed.

Calculation of Score

Figure 17:
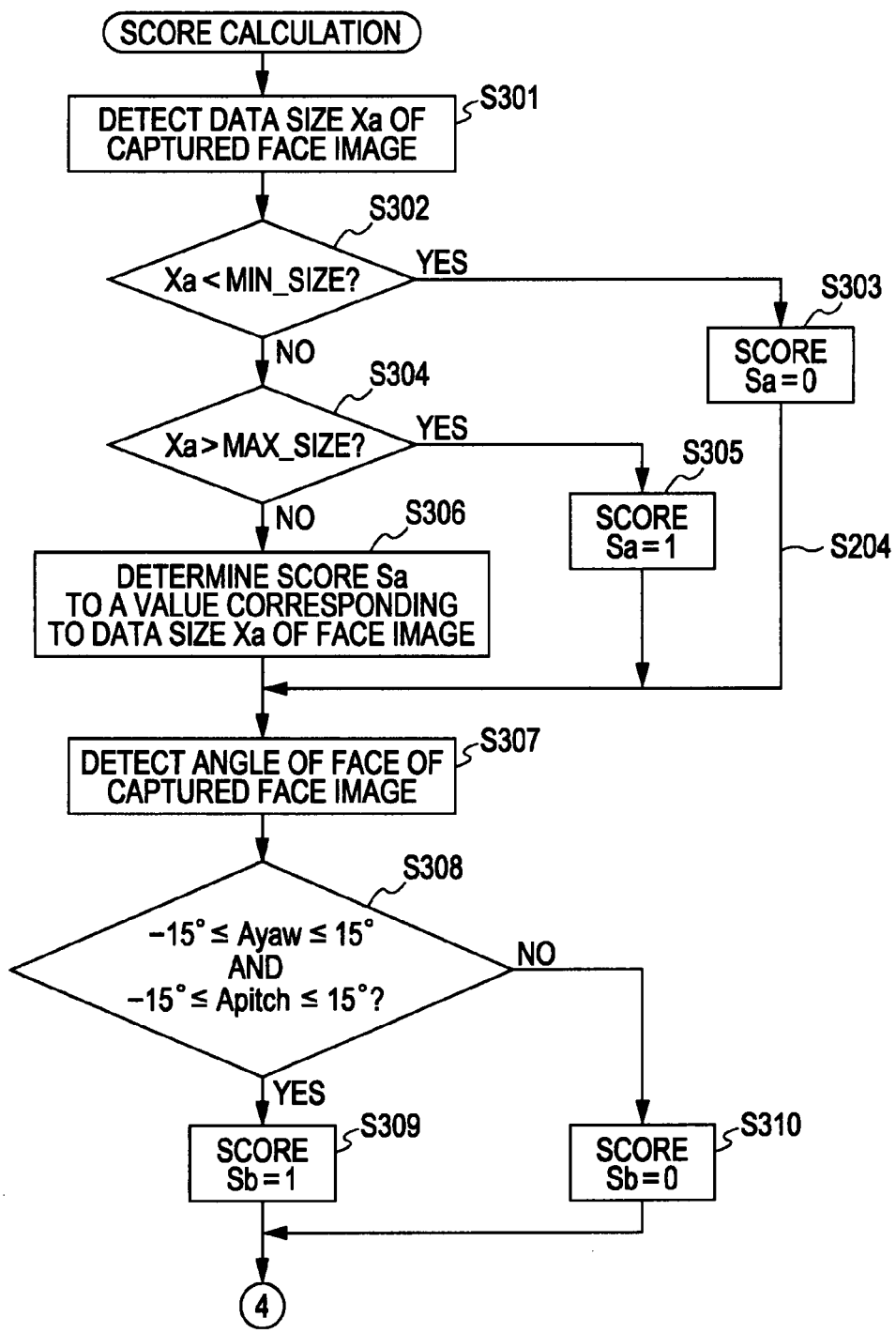
FIG. 17 is a flow chart illustrating a part of a score calculation process performed by a person identification apparatus according to an embodiment of the present invention.
Figure 18:
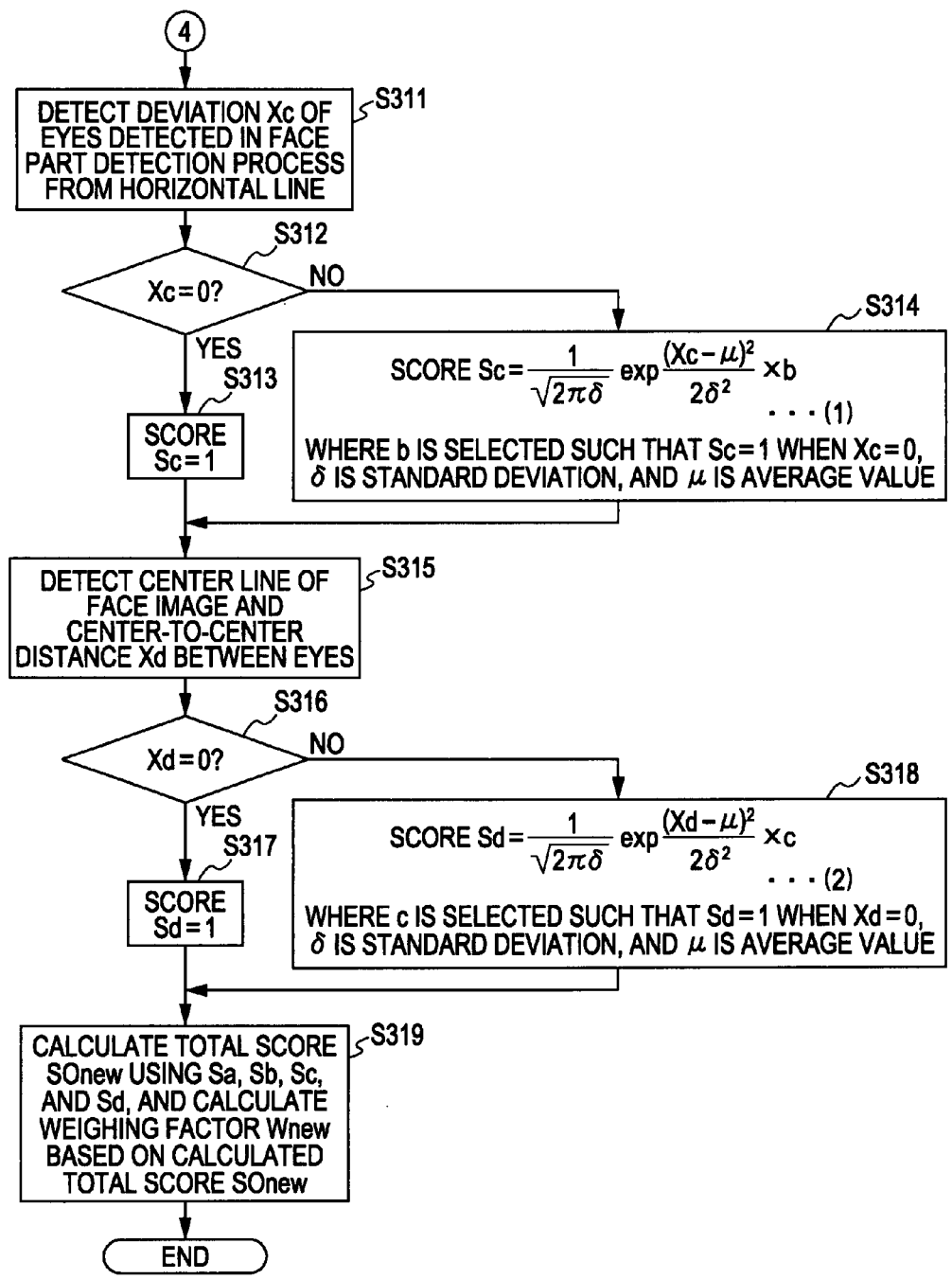
FIG. 18 is a flow chart illustrating another part of the score calculation process performed by the person identification apparatus according to the embodiment of the present invention.

Next, the process of calculating the total score and the weighting factor performed by the score calculation unit 14 are described below. FIG. 17 is a flow chart illustrating a part of the process of calculating the total score and the weighting factor performed by the score calculation unit 14, and FIG. 18 is a flow chart illustrating a part following the part shown in FIG. 17.

First, the score calculation unit 14 detects the data size Xa of the face image data received from the face recognition image processing unit 11 (step S301), and the score calculation unit 14 determines whether the detected data size Xa of the face image data is smaller than a predetermined lower limit MIN_SIZE of the data size allowable for the face image (step S302).

If the score calculation unit 14 determines that the data size Xa of the face image data is smaller than the lower limit MIN_SIZE, the score calculation unit 14 determines the score Sa associated with the data size Xa of the face image data such that Sa=0 as shown in FIG. 8 (step S303).

In a case where it is determined that the data size Xa of the face image data is not smaller than the lower limit MIN_SIZE, the score calculation unit 14 determines whether the data size Xa of the face image data is greater than a predetermined sufficiently high value MAX_SIZE (step S304).

In a case where the score calculation unit 14 determines in step S304 that the data size Xa of the face image data is greater than MAX_SIZE, the score calculation unit 14 determines the score Sa such that Sa=1 as shown in FIG. 8 (step S305).

On the other hand, in a case where it is determined in step S304 that the data size Xa of the face image data is smaller than the predetermined sufficiently high value MAX_SIZE, the score calculation unit 14 sets the score Sa to a value depending on the data size Xa of the face image data as shown in FIG. 8 (step S306).

Next, the score calculation unit 14 detects the orientation (angle) of the face of the captured face image (step S307). The score calculation unit 14 then detects the angle $A_{yaw}$ indicating the deviation in the yaw direction of the orientation of the face image from the exact front direction and the angle $A_{pitch}$ indicating the deviation in the pitch direction of the orientation of the face image from the exact front direction (step S307), and the score calculation unit 14 determines whether the detected angles $A_{yaw}$ and $A_{pitch}$ are both within the predetermined allowable ranges, that is, whether the following conditions are satisfied (step S308).

$$-15° \leq A_{yaw} \leq +15°$$

and $$-15° \leq A_{pitch} \leq +15°$$

In a case where it is determined in step S308 that the angles $A_{yaw}$ and $A_{pitch}$ are both within the predetermined allowable ranges, the score calculation unit 14 determines the score Sb associated with the orientation of the face such that Sb=1 (step S309).

In a case where it is determined in step S308 that one or both of the angles $A_{yaw}$ and $A_{pitch}$ are out of the allowable ranges, the score calculation unit 14 determines the score Sb such that Sb=0 (step S310).

After step S309 or step S310, the process proceeds to step S311 shown in FIG. 18. In step S311, the score calculation unit 14 detects the deviation of the positions of two eyes detected in the part detection process from the horizontal positions, that is, the score calculation unit 14 detects the vertical distance Xc between the two eyes as described above with reference to FIG. 10.

The score calculation unit 14 determines whether the detected distance Xc is equal to 0, that is, whether the two eyes are on a horizontal line (step S312). In a case where it is determined that the two eyes are on the horizontal line, the score calculation unit 14 determines the score Sc such that Sc=1 (step S313). However, in a case where it is determined in step S312 that the two eyes are not on a horizontal line, the score calculation unit 14 calculates the score Sc in accordance with formula (1) based on the Gaussian distribution function (step S314).

After step S313 or step S314, the process proceeds to step S315. In step S315, the score calculation unit 14 detects the distance Xd between the center line 41 of the face image and the middle point 42 between the two eyes (step S315).

The score calculation unit 14 determines whether the detected distance Xd is equal to 0 (Xd=0) and thus the orientation of the face image is in the exact front direction (step S316). If it is determined that the orientation of the face image is in the exact front direction, the score calculation unit 14 determines the score Sd such that Sd=1 (step S317). In a case where it is determined in step S316 that the orientation of the face image has a deviation from the exact front direction, the score calculation unit 14 calculates the score Sd in accordance with formula (2) based on the Gaussian distribution function (step S318).

After step S313 or step S314, the process proceeds to step S315. In step S315, the score calculation unit 14 calculates the total score SOnew using the Sa, Sb, Sc, and Sd and calculates the weighting factor Wnew from the calculated total score SOnew (step S319). Thus, the score calculation process performed by the score calculation unit 14 is completed.

In the embodiments described above, after the person identification is performed, the face recognition dictionary data is updated based on the newly captured face image. Alternatively, the captured face image data or a set of the feature vector, the time information, the total score, and the weighting factor may be temporarily stored, and the face recognition dictionary data may be updated at a later time after the person identification is performed.

Instead of storing both the total score and the weighting factor in the temporary memory or the person dictionary storage unit, one of the total score and the weighting factor may be stored. In a case where the weighting factor is stored, the determination as to whether the dictionary data should be updated may be made not according to the total score but according to the weighting factor.

As described above, in the embodiments described above, the total score $SO_{i,n}$ indicating the reliability of the feature vector of the face image is described in each of the N pieces of dictionary data production information $DPI_{i,n}$ of the person dictionary data $D_i$ of each person $P_i$. Thus, when a face image is newly captured, it is possible to determine whether the face recognition dictionary data should be updated using the newly captured face image, by comparing the total score SOnew indicating the reliability of the feature vector of the newly captured face image with each of the N total score $SO_{i,n}$ (n=1 to N) of the feature vectors of the face images.

If it is determined that the total score SOnew of the newly captured face image is greater than the total score of some of the N dictionary data production information $DPI_{i,n}$ in the person dictionary data $D_i$ of the person $P_i$, then dictionary data production information $DPI_{i,n}$ with a lowest total score $SO_{i,n}$ is replaced with the dictionary data production information including the feature vector and other parameters of the newly captured face image thereby maintaining the person dictionary data $D_i$ of each person so as to have N pieces of dictionary data production information with high total scores and thus high reliability.

The face recognition dictionary data $FRD_i$ is recalculated using an updated set of N pieces of dictionary data production information $DPI_{i,n}$ with high reliability, and thus the face recognition dictionary data $FRD_i$ is maintained in a highly reliable state.

In the embodiments described above, the face recognition dictionary data $FRD_i$ is given not by the simple average of feature vectors of respective N pieces of dictionary data production information $DPI_{i,n}$ but by the sum of the feature vectors weighted by factors determined depending on the corresponding total scores divided by the sum of the weighting factors, and thus the feature values having higher reliability have greater contributions to the face recognition dictionary data $FRD_i$. Thus, the face recognition dictionary data $FRD_i$ is maintained so as to have high reliability.

Other Embodiments

In the embodiments described above, the present invention is applied to the face recognition apparatus. However, the present invention may also be applied to wide variety of apparatuses.

For example, in a person identification process using a voice, a fingerprint, an iris pattern, a vein pattern and/or the like as recognition elements, one or more scores may be calculated based on a deviation of one or more parameters from reference values of each recognition element. If there are two or more scores, the total score may be calculated from the two or more scores.

As in the embodiments described above, a plurality of pieces of dictionary data production information may be selected based on the score of the total score, and identification dictionary data may be updated using the selected dictionary data production information.

The present invention may be applied not only to the person identification process, but also to other many processes. For example, in a machine adapted to automatically take a picture for use on an identification card or the like, a predetermined number of pictures are taken, and the total score is calculated for each picture based on deviations from predetermined standard conditions in terms of the orientation of the face, the positions of eyes, etc. One or more pictures having high total scores and thus high quality are finally provided to a user.

In a case where a group picture of many persons is taken, two or more pictures are taken, and the score is calculated for each of the two or more pictures depending on a degree of satisfaction of a requirement of a standard condition (for example, there is no person with eyes having unnatural color in the picture). By selecting a picture with a highest score from the two or more pictures, it is possible to provide a picture with highest quality.

In a case where a plurality of photographic pictures are stored in a photo album in a memory of a personal computer, the score or the total score is calculated for each picture based on a deviation or deviations from a standard condition or conditions such as that the picture includes a human face, the picture includes large high-frequency components (that is, the picture is high in sharpness), etc., and the calculated score or the total score are stored in association with the photographic pictures.

The pictures may be arranged in the order from the highest score or total score to lower scores or total scores, that is, in the order from the picture with a condition closest to the standard condition.

In addition to the examples described above, the present invention has a wide variety of applications.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   acquisition means for acquiring information of a predetermined type;
   reliability information producing means for producing reliability information indicating reliability of the information of the predetermined type based on a deviation from a predetermined standard condition; and
   storage means for storing the reliability information indicating the reliability of the information of the predetermined type produced by the reliability information producing means, in association with the information of the predetermined type,
   wherein the storage means is adapted to store a plurality of pieces of information of the predetermined type up to a predetermined number of pieces of information, and in a case where a new piece of information of the predetermined type is acquired in a state in which the predetermined number of pieces of information of the predetermined type have already been stored in the storage means, the reliability generated for the newly acquired piece of information of the predetermined type is compared with the reliability of each of the plurality of pieces of information of the predetermined type stored in the storage means, and if any of the plurality of pieces of information of the predetermined type has a reliability lower than the reliability of the newly acquired piece of information of the predetermined type, a respective one of the plurality of pieces of information having a lowest reliability is deleted from the storage means and the newly acquired piece of information of the predetermined type is stored instead.

2. The information processing apparatus according to claim 1, wherein the acquired information of the predetermined type is a face image of a person, and the standard condition is a condition in terms of the face image.

3. The information processing apparatus according to claim 2, wherein the standard condition is a condition defined for recognition of the face image.

4. A person identification apparatus, comprising:
   a dictionary data storage unit adapted to store person identification dictionary data associated with a person produced from a plurality of feature vectors extracted from an identification element of the person such that the person identification dictionary data is stored in association with person identification information identifying the person;
   identification means for identifying an acquired identification element to be that of a person having an identical identification element by comparing the feature vector extracted from the acquired identification element with the identification dictionary data stored in the dictionary data storage unit;

reliability information producing means for producing reliability information indicating reliability of the acquired identification element based on deviations from predetermined standard conditions of the identification element;

a dictionary data production information storage unit adapted to store, for each person to be identified, a plurality of the reliability information indicating the reliability of the identification element of the person respectively associated with the plurality of feature vectors extracted from the identification element of the person; and dictionary data producing/updating means for producing or updating the stored identification dictionary data associated with a given person using the feature vector extracted from the acquired identification element and the reliability information of the acquired identification element, wherein each of the plurality of feature vectors is weighted by a respective weighting factor determined according to its associated reliability information.

5. The person identification apparatus according to claim 4, wherein the identification element of the person to be identified is a human face image, and the standard condition is a condition defined for recognition of the face image.

6. The person identification apparatus according to claim 5, wherein the standard condition is defined in terms of at least one of the image data size of the face image, the orientation of the face image, and the tilt of the face image.

7. An information processing method for an information processing apparatus including reliability information producing means and storage means, the method comprising:

producing, by the reliability information producing means, reliability information indicating reliability of acquired information of the predetermined type based on a deviation from a predetermined standard condition in terms of the information of the predetermined type as acquired; and storing, by the storage means, the produced reliability information indicating reliability of the information of the predetermined type in association with the information of the predetermined type, wherein the storage means is adapted to store a plurality of pieces of information of the predetermined type up to a predetermined number of pieces of information, and in a case where a new piece of information of the predetermined type is acquired in a state in which the predetermined number of pieces of information of the predetermined type have already been stored in the storage means, the reliability produced for the newly acquired piece of information of the predetermined type is compared with the reliability of each of the plurality of pieces of information of the predetermined type stored in the storage means, and if any of the plurality of pieces of information of the predetermined type has a reliability lower than the reliability of the newly acquired piece of information of the predetermined type, a respective one of the plurality of pieces of information having a lowest reliability is deleted from the storage means and the newly acquired piece of information of the predetermined type is stored instead.

8. A method of producing or updating dictionary data in a person identification apparatus including a dictionary data storage unit adapted to store person identification dictionary data associated with a person produced from a plurality of feature vectors extracted from an identification element of the person such that the person identification dictionary data is stored in association with person identification information identifying the person, identification means for identifying an acquired identification element to be that of a person having an identical identification element by comparing the feature vector extracted from the acquired identification element with the identification dictionary data stored in the dictionary data storage unit, dictionary data producing/updating means for producing or updating the identification dictionary data, reliability information producing means, and dictionary data production information storage unit, the method comprising:

producing, by the reliability information producing means, reliability information indicating reliability of the acquired identification element based on a deviation from a predetermined standard condition of the identification element;

storing, in a dictionary data production information storage unit for each person to be identified, a plurality of the reliability information indicating reliability of the identification element of the person respectively associated with the plurality of feature vectors extracted from the identification element of the person to be identified; and producing or updating, by the dictionary data producing/updating means, the stored identification dictionary data associated with a given person using the feature vector extracted from the acquired identification element and the reliability information of the acquired identification element, wherein each of the plurality of feature vectors is weighted by a respective weighting factor determined according to its associated reliability information.

9. A person identification apparatus including a processor encoded with a dictionary data generation/update computer program, a dictionary data storage unit adapted to store person identification dictionary data associated with a person produced from a plurality of feature vectors extracted from an identification element of the person such that the person identification dictionary data is stored in association with person identification information identifying the person, and identification means for identifying an acquired identification element to be that of a person having an identical identification element by comparing the feature vector extracted from the acquired identification element with the identification dictionary data stored in the dictionary data storage unit, wherein execution of the program causes the processor to function as:

detection means for detecting a deviation of the acquired identification element from a predetermined standard condition of the identification element;

reliability information producing means for producing reliability information according to the deviation detected by the detection means;

dictionary data production information storage unit for storing, for each person to be identified, a plurality of the reliability information indicating reliability of the identification element of the person respectively associated with the plurality of feature vectors extracted from the identification element of the person; and dictionary data producing/updating means for producing or updating identification dictionary data corresponding to the person identification information of a given person using the feature vector extracted from the acquired identification element and the reliability information of the acquired identification element, wherein each of the plurality of feature vectors is weighted by a respective weighting factor determined according to its associated reliability information.

10. An information processing apparatus, comprising:
an acquisition unit adapted to acquire information of a predetermined type;
a reliability information producing unit adapted to produce reliability information indicating reliability of the information of the predetermined type based on a deviation from a predetermined standard condition; and
a storage unit adapted to store the reliability information indicating the reliability of the information of the predetermined type produced by the reliability information producing unit, in association with the information of the predetermined type,
wherein the storage unit is adapted to store a plurality of pieces of information of the predetermined type up to a predetermined number of pieces of information, and in a case where a new piece of information of the predetermined type is acquired in a state in which the predetermined number of pieces of information of the predetermined type have already been stored in the storage unit, the reliability generated for the newly acquired piece of information of the predetermined type is compared with the reliability of each of the plurality of pieces of information of the predetermined type stored in the storage unit, and if any of the plurality of pieces of information of the predetermined type has a reliability lower than the reliability of the newly acquired piece of information of the predetermined type, a respective one of the plurality of pieces of information having a lowest reliability is deleted from the storage unit and the newly acquired piece of information of the predetermined type is stored instead.

11. A person identification apparatus, comprising:
a dictionary data storage unit adapted to store person identification dictionary data associated with a person produced from a plurality of feature vectors extracted from an identification element of the person such that the person identification dictionary data is stored in association with person identification information identifying the person;
an identification unit adapted to identify an acquired identification element to be that of a person having an identical identification element by comparing the feature vector extracted from the acquired identification element with the identification dictionary data stored in the dictionary data storage unit;
a reliability information producing unit adapted to produce reliability information indicating reliability of the acquired identification element based on deviations from predetermined standard conditions of the identification element;
a dictionary data production information storage unit adapted to store, for each person to be identified, a plurality of the reliability information indicating the reliability of the identification element of the person respectively associated with the plurality of feature vectors extracted from the identification element of the person; and
a dictionary data producing/updating unit adapted to produce or update the stored identification dictionary data associated with a given person using the feature vector extracted from the acquired identification element and the reliability information of the acquired identification element,
wherein each of the plurality of feature vectors is weighted by a respective weighting factor determined according to its associated reliability information.

* * * * *